United States Patent
Kalt et al.

(10) Patent No.: US 6,692,646 B2
(45) Date of Patent: Feb. 17, 2004

(54) METHOD OF MANUFACTURING A LIGHT MODULATING CAPACITOR ARRAY AND PRODUCT

(75) Inventors: Charles G Kalt, Williamstown, MA (US); Mark S. Slater, North Adams, MA (US); Elliot Schlam, Wayside, NJ (US)

(73) Assignee: Display Science, Inc., North Adams, MA (US)

(*) Notice: Subject to any disclaimer, the term of this patent is extended or adjusted under 35 U.S.C. 154(b) by 270 days.

(21) Appl. No.: 09/939,907

(22) Filed: Aug. 27, 2001

(65) Prior Publication Data

US 2002/0036059 A1 Mar. 28, 2002

Related U.S. Application Data

(60) Provisional application No. 60/228,663, filed on Aug. 29, 2000.

(51) Int. Cl.[7] .......................... B29D 11/00; G02B 26/00
(52) U.S. Cl. ......................................... 216/24; 359/290
(58) Field of Search .................. 216/2, 24, 6; 359/223, 359/224, 230, 231, 237, 238, 247, 254, 227, 228, 290, 291, 292, 298; 361/301, 280, 281, 271, 277, 313, 303, 328

(56) References Cited

U.S. PATENT DOCUMENTS

| | | | |
|---|---|---|---|
| 3,989,357 A | 11/1976 | Kalt | |
| 4,029,392 A | 6/1977 | Moriyama et al. | |
| 4,109,241 A | 8/1978 | Shanks | |
| 4,266,339 A | 5/1981 | Kalt | |
| 4,336,536 A | 6/1982 | Kalt et al. | |
| 4,430,648 A | 2/1984 | Togashi et al. | |
| 4,509,854 A | 4/1985 | Pearson | |
| 4,556,289 A | 12/1985 | Fergason | |
| 4,693,560 A | 9/1987 | Wiley | |
| 4,794,370 A | 12/1988 | Simpson et al. | |
| 5,019,807 A | 5/1991 | Stapleton et al. | |
| 5,052,785 A | 10/1991 | Takimoto et al. | |
| 5,128,662 A | 7/1992 | Failla | |
| 5,147,743 A | 9/1992 | Grossa | |
| 5,231,559 A | * 7/1993 | Kalt et al. | 361/301.5 |
| 5,233,459 A | 8/1993 | Bozler et al. | |
| 5,250,931 A | 10/1993 | Misawa et al. | |
| 5,340,619 A | 8/1994 | Chen et al. | |
| 5,401,616 A | 3/1995 | Isomi et al. | |
| 5,406,304 A | 4/1995 | Shirayama | |

(List continued on next page.)

FOREIGN PATENT DOCUMENTS

| | | |
|---|---|---|
| EP | 0330361 | 8/1989 |
| EP | 0455233 | 4/1991 |

*Primary Examiner*—Gregory Mills
*Assistant Examiner*—Roberts Culbert
(74) *Attorney, Agent, or Firm*—Anthony H. Handal; Kirkpatrick & Lockhart LLP

(57) ABSTRACT

A method of manufacturing a light modulating capacitor display by successive operations on an assembly comprising forming a layer of a conductive material on a substrate in a pattern is disclosed. The pattern forms a plurality of fixed electrodes. The pattern forms electrical conductors for driving the fixed electrodes and electrical conductors for driving shutter electrodes. A layer of insulative material is laid over portions of the pattern forming the plurality of fixed electrodes. A shutter electrode forming layer is attached to the assembly. The shutter electrode forming layer has a conductive side and a nonconductive side. The conductive side is placed in facing, contacting relationship to the layer of insulative material and the pattern of conductive material. The conductive material is removed from the shutter electrode forming layer to form groups of shutter electrodes. A plurality of shutters are cut from the shutter electrode forming layer.

19 Claims, 17 Drawing Sheets

U.S. PATENT DOCUMENTS

| | | |
|---|---|---|
| 5,406,305 A | 4/1995 | Shimomura et al. |
| 5,469,020 A | 11/1995 | Herrick |
| 5,497,146 A | 3/1996 | Hebiguchi |
| 5,506,705 A | 4/1996 | Yamamoto et al. |
| 5,519,565 A | 5/1996 | Kalt et al. |
| 5,604,513 A | 2/1997 | Takahashi et al. |
| 5,618,469 A | 4/1997 | Harlev et al. |
| 5,626,795 A | 5/1997 | Smith et al. |
| 5,635,950 A | 6/1997 | Okada et al. |
| 5,638,084 A | 6/1997 | Kalt |
| 5,670,973 A | 9/1997 | Bassetti, Jr. et al. |
| 5,784,189 A * | 7/1998 | Bozler et al. ............... 359/254 |
| 5,786,797 A | 7/1998 | Kapoor et al. |
| 5,900,850 A | 5/1999 | Bailey et al. |
| 5,917,431 A | 6/1999 | Sanada et al. |
| 5,919,397 A | 7/1999 | Ichihashi et al. |
| 6,067,183 A * | 5/2000 | Furlani et al. ............... 359/254 |
| 6,107,941 A | 8/2000 | Jones |
| 6,144,359 A | 11/2000 | Grave |
| 6,172,798 B1 | 1/2001 | Albert et al. |
| 6,317,108 B1 | 11/2001 | Kalt |

* cited by examiner

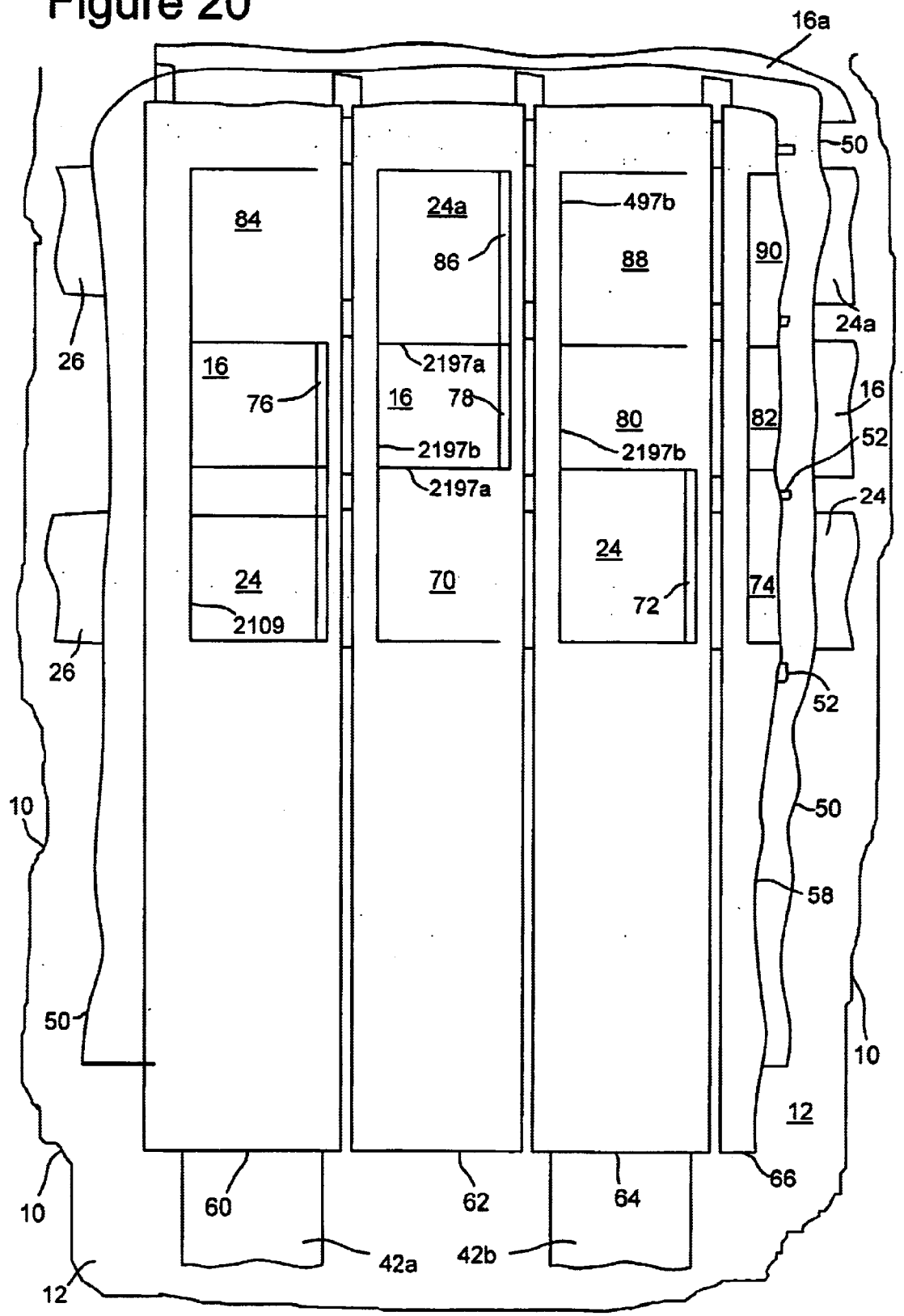

METHOD OF MANUFACTURING A LIGHT MODULATING CAPACITOR ARRAY AND PRODUCT

CROSS-REFERENCE TO RELATED APPLICATIONS

This application claims the benefit of provisional application No. 60/228,663 filed Aug. 29, 2000.

TECHNICAL FIELD

The present invention relates to methods of making light modulating capacitors and is of particular interest in the provision of a panel comprising an array of display many light modulating capacitor pixels comprising fixed electrodes and movable electrode shutters.

BACKGROUND

Almost from the dawn of the industrial age, scientists were fascinated with the possibility of communication between remote points in coded, audio and visual formats. In France, even as early as the late 1700's, elaborate semaphore systems enjoyed substantially widespread use. While such systems achieved their maximum readability during the darkness, and relied, to a large extent, on a subjective evaluation of a signal by the human eye in a sometimes noisy environment, the same represented a dynamic leap of progress over previously employed communications systems.

The invention of the telegraph by Morse in the early 1800's provided a means for rapid communication which effectively addressed virtually all the perceived limitations of semaphore communication. While the telegraph did require the installation of a telegraph wire hundreds and, ultimately, thousands of miles long, the telegraph insulated its users from dependence on good visibility conditions, fog, rain, atmospheric conditions and high levels of skylight due to natural and/or artificial causes. In addition, being a digital system, it gave users an output that was as sharp, noise-free and readable at the point of reception as it was at the point of transmission.

Even before the invention of the telephone by Bell in 1876, it was recognized that electrical wires could be used to transmit video signals from a transmission point to a remote location. At least as early as the 1860's, French scientists proposed the possibility of scanning an object illuminated by candlelight using a Nipkow disk, reading the reflected light using a photoelectric device, and transmitting the signal over a wire to a remote point for recording on paper impregnated with gunpowder for viewing.

The weak point in that system (as well as in all modern video systems) was the display. Their proposed solution was to scan a sheet of paper mounted on a drum and impregnated with gunpowder with a high voltage ignition spark which burned in the image scanned by the Nipkow disk. While those familiar only with current state-of-the-art display technology might view such a technique as impractical, it was exactly this display technology which was employed by the great international news services during the first half of the 20th century to transmit photographs by wire. Systems of this sort remained in service at least through the 1960's.

Although this system had many inherent limitations, it had a number of virtues which no other widely employed display technology has succeeded in matching. For example, the system used very low power and produced very clear sharp images. Unlike liquid crystals, received pictures were visible over a wide angle of view. Unlike cathode ray tube images, images produced by this system enjoyed superb readability even under intense illumination. Still yet another advantage of this system was its low cost.

Of course, such a system could only have limited application because of the exhaustion of the display member by a single frame of transmitted information.

While, during this early period in the history of video display technology, researchers working in the field may have entertained the possibility of a transient reflective mosaic as a video display, a transient controllable light source must have appeared to have a much greater possibility of success, given the number of candidates which included, even at the turn of the century, the incandescent lamp, the neon lamp, and, of course, the cathode ray tube. The earliest commercial "video" displays were signs, the most notable being so-called "neon" signs and incandescent bulb matrix arrays, such as those found on news marquees.

However, with the rapid development of vacuum tube technology in the period surrounding World War I, the cathode ray tube became a practical solution, insofar as it relied upon plate, vacuum and grid technologies, all of which had been developed for other purposes.

Notwithstanding the limitations of the cathode ray tube, which included poor readability in sunlight, cumbersome size, excessively high voltage, the possibility of dangerous X-radiation, and so forth, researchers adopted what must now be considered a low-tech solution and proceeded instead to develop camera technology. Thus, even today, the cathode ray tube in a form substantially unchanged from its earliest embodiments remains the display standard, nearly a century after it was proposed.

When the time came to select a standard format for color television, a purely electronic display system was again selected. While some consideration was given to a rotating color filter wheel system developed by the Columbia Broadcasting System, those responsible for selection of a national color television standard were uncertain whether we would ever have the technology to reliably mechanically control a video display and thus opted in favor of what would also come to be recognized as a problematic approach, namely, the shadow mask cathode ray tube. There was also a general bias against mechanical systems in what was assumed to be the emerging all electronic world.

In one sense the concensus was correct, and the development of better synchronization systems, improved mask configurations and systems, and manufacturing controls resulted in definitively stable and extremely high quality displays. However, nearly a half century later the inherent limitations of the cathode ray tube have also become painfully apparent. So-called "large screen" televisions can only be achieved by using small tubes and clumsy projection optics. Resulting pictures are of such low intensity that acceptable viewing can only be had in the dark. Stray light creates general deterioration in image resolution both by decreasing the signal-to-noise ratio in the display picture and reducing the chrominance content of the projected picture. The end result is a physically large, high voltage and high power system which produces a poor dim picture. Finally, there is a growing concern over CRT radiation output, above and beyond the X-band radiation problem which was substantially solved in the 1970's. There has never been any significant use of the CRT in outdoor displays, which still use light emitting elements such as the incandescent light bulb and more recently light emitting diodes.

In an attempt to address these problems, manufacturers have turned to liquid crystal display technology. While such display technology may lend itself to moderately large flat displays which will operate at relatively low voltage, such displays are very expensive to manufacture.

A most promising candidate for the solution of the above problems is the ("LMC") or light modulating capacitor. LMC's come in a wide range of structures and include reflective as well as transmissive devices.

Generally, light modulating capacitors comprise at least one fixed electrode and an active electrode typically made of metalized plastic film. Modulation of light in a pixel is achieved by physical displacement of the active electrode with respect to the fixed electrode, changing the reflective and/or transmissive characteristics of the device. Actuation of the active electrode is accomplished by electrostatically attracting or repelling the variable electrode to a desired position. In the case of an active electrode made of metalized Mylar brand polyester film, the electrode is extremely light, may be prestressed to increase the range of configuration possibilities, and requires extremely low power and relatively low voltage to operate effectively and quickly.

When I first proposed such a device in the early 1970's, the active electrode generally had the shape of a flapper which was electrostatically driven from one position to another, typically in a two color grove having a V-shaped cross-section, much like a pair of differently colored pages in a half-opened book. Because the flapper is highly reflective, when it is in a first position, it reflects the color of the inside of the groove on the side of the groove opposite that on which it is resting. Thus, when each side of the V-shaped groove is given a different color, the groove appears be to completely the color of the side opposite the active electrode. Because this could be a reflective device, it operated well in ambient light and with only the smallest consumption of electricity insofar as the light modulating capacitor would only pass enough current to charge its internal capacitance.

I have previously proposed the possibility of a prestressed metalized plastic electrode which, in its relaxed state comprised a coiled active electrode which would be electrostatically unrolled over a flat panel, thus changing the color of the flat panel to the color of the active electrode with the device configured as a light reflecting capacitor. Such devices are sometimes referred to as being of the roll-out type. I have also suggested the possibility of a light transmitting window where the device might be backlit and the active electrode used to control the transmission of light through the device.

Similarly, I have proposed the possibility of a large matrix of light modulating capacitors being manufactured in a mass production operation and comprising a single multi-pixel module. In this system, the pixel took the configuration of a V profile flapper-type device.

While the functional characteristics of the above systems have numerous advantages over competing technologies, such as liquid crystal displays, cathode ray tubes and plasma systems, the complexities of achieving economical manufacture pose particular challenges, insofar as each pixel is embodied in a mechanical part that must move quickly and reliably thousands of millions of times. Wrinkles, excess fabrication material, trapped static charges and the like all compromise functionality. At the same time, the system requires substantial bussing to be fabricated at close quarters to moving pixel parts, increasing the likelihood of the introduction of additional defects into the system.

SUMMARY OF THE INVENTION

The invention, as claimed, is intended to provide a highly efficient solution to the problem of how to construct a multi-element matrix display. In accordance with the invention, the same is achieved in the context of a light modulating capacitor of the roll-out type.

BRIEF DESCRIPTION OF THE DRAWINGS

One way of carrying out the invention is described in detail below with reference to drawings in which dimensions and proportions have been exaggerated for purposes of clarity of illustration, and in which:

FIG. 20 illustrates the completed alternative structure of FIG. 19;

BEST MODE FOR CARRYING OUT THE INVENTION

Figure 1:
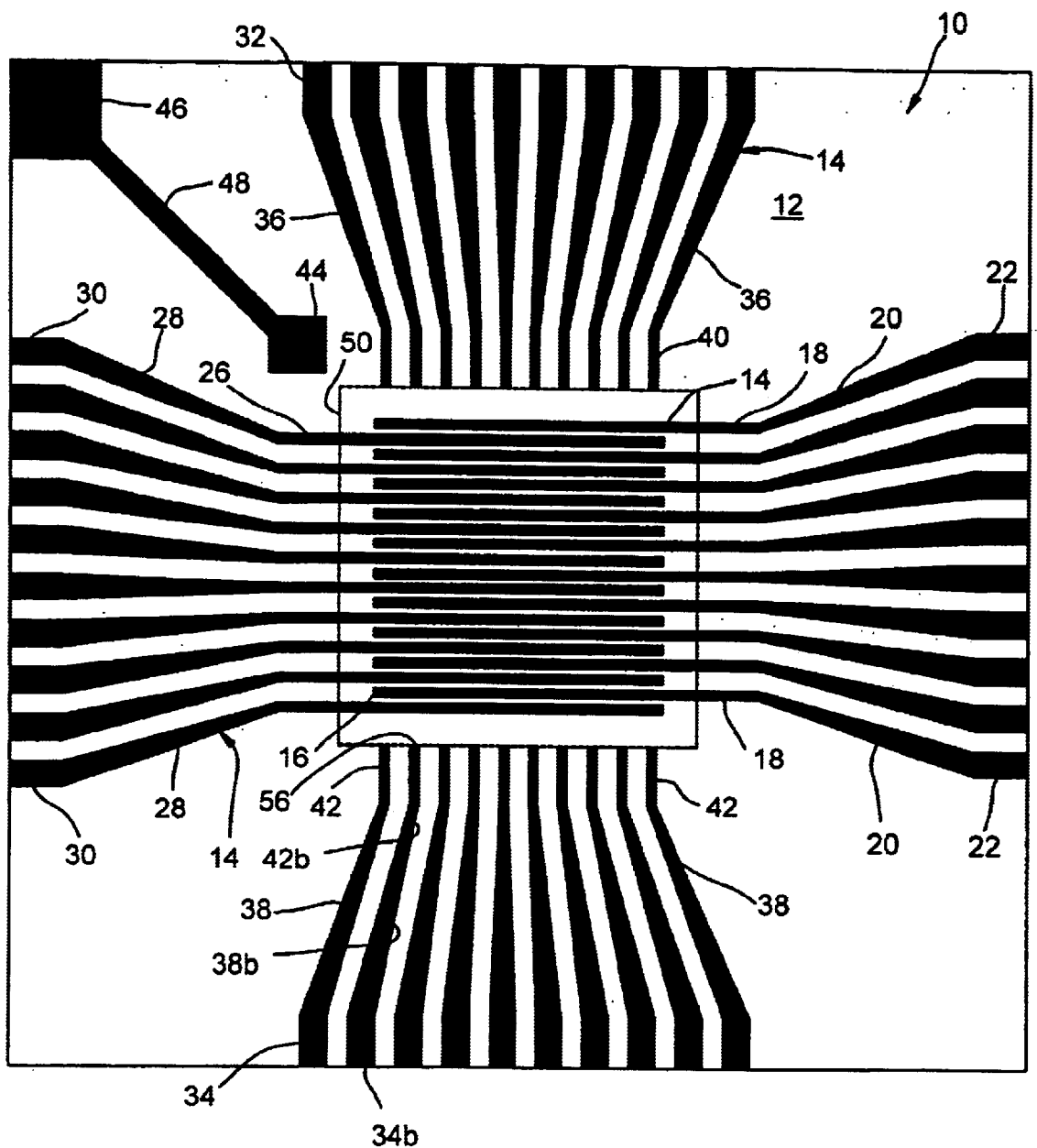
FIG. 1 illustrates the first step in the manufacture of the inventive light-reflective or light transmissive raster display system.

Referring to FIG. 1, the first step in the manufacture of a light-reflective raster display system is illustrated. The inventive light-reflective raster display system is constructed on a substrate 10, made of plastic, glass or any other suitable insulative material. Substrate 10 is also selected for its rigidity in accordance with the preferred embodiment of the invention, although the use of a substrate with flexibility in limited regions or in one direction may provide the possibility of a foldable, rollable or otherwise compactable display. In addition, lightweight materials are preferred for employment as a substrate 10, particularly in applications where the device is portable.

Where weight is a consideration, alternative structures can be used in place of a simple plate for substrate 10. For example, substrate 10 may be comprised of any lightweight metal alloy coated with an insulative material.

Alternatively, also in accordance with the present invention, plastic reinforced with fibers, such as fiberglass fibers or carbon fibers, may be employed to achieve strength, rigidity, physical thinness, and lightness of weight. In accordance with the present invention, such fibers would be oriented parallel to the plane of substrate 10, lie inside substrate 10 and extend in different directions in order to achieve bi-axial rigidity and strength. More particularly, because such fibers are not free to move within substrate 10, the placement of fibers in two orthogonal directions, both parallel to the plane of substrate 10 and both positioned at different depths within the thickness of the substrate, will give the desired multi-axial rigidity and strength. When flexability is desired, plastic of the appropriate thickness for the particular material employed.

The placement of fibers at different depths or fibers in an orthogonal directions is advantageous so that in addition to being put into compression of the at one depth in the thickness of material, reinforcing carbon or fiberglass fibers will be put in tension at another depth in the thickness of material, regardless of the direction of flexing forces applied to substrate 10. This will enhance rigidity.

In order to provide this characteristic in different directions, it is also necessary that fibers be put at different depths in the case of the fibers in both orthogonal directions.

The top surface 12 of substrate 10 is, in accordance with the preferred embodiment of the invention, a smooth and flat surface. Top surface 12 of substrate 10 has a printed circuit 14 deposited on it. Printed circuit 14 is made of copper and is deposited on top surface 12 in accordance with known techniques, for example, by bonding a copper foil to top surface 12 and using photolithography to etch away portions of the copper foil to leave the pattern illustrated in FIG. 1.

Generally, the pattern of printed circuit 14 comprises a plurality of conductive fixed electrode strips 16, each of which forms the base electrode of a plurality of pixels in a row associated with the respective conductive fixed electrode strip 16, as more fully appears below. Each conductive fixed electrode strip 16 is connected by a respective conductive connector span 18, to its respective converging span 20, which, in turn, is connected to its respective row driver contact edge 22. Strips 16 and spans 18–22 would typically be a single element and may together form a variety of configurations, for example, a straight line (depending on the size and resolution of the display.)

As illustrated in FIG. 1, the printed circuit pattern 14 also comprises a plurality of alternating conductive fixed electrode strips 24, each of which forms the base electrode of a plurality of pixels in a row associated with the respective conductive fixed electrode strip 24, as more fully appears below. Each conductive fixed electrode strip 24 is connected by a respective conductive connector span 26, to its respective converging span 28, which, in turn, is connected to its respective row driver contact edge 30. Row driver contact edges 22 and 32 serve the function of connecting to an external drive source for providing drive signals to their respective rows of pixels.

Here again configurations may be varied depending on resolution and size. The difference between strips 16 and 24 is simply that one is left side and the other is right side. They are interdigitated. They don't have to be interdigitated, but the Same aids in interconnection density. Depending upon the configuration demands, all electrodes could be on the left or the right side, for example.

Column driver contact edges 32 and 34 serve the function of connecting to an external drive source for providing drive signals to the respective columns of pixels associated with each of the column driver contact edges 32 and 34. More particularly, column driver contact edges 32 and 34 couple signal which are sent to the movable or spiral electrodes of the pixels which form the inventive matrix display system.

Column driver contact edges 32 and 34 are, in turn, each electrically and physically connected to its respective converging span 36 and 38, respectively. Similarly, each of the converging spans 36 and 38 is connected, electrically and physically, to its respective connection span 40 and 42. The above comments respecting interdigitation and configuration may be applied to edges 32 and 34 and spans 36, 38, 40 and 42.

As is known, displays of the type of the present invention may be of the front lit or the back lit variety or both. In the case of a front lit device, a material like copper will function well as a conductive fixed electrode strip base electrode for a pixel. However, if one wishes to have a backlit device, it is necessary that the material which forms the base member of the pixel be transparent. In such circumstances, a transparent conductive material such as indium tin oxide is most suitable for the base electrode. Here again, such material is well-known, and known techniques may be used for the deposition of the indium tin oxide layer in the pattern illustrated in FIG. 1. Generally, these techniques are similar to that used in the case of copper printed circuits. More particularly, the indium tin oxide may be deposited by sputtering or any other deposition technique, and then photoetched, again using photolithographic techniques.

As will become apparent from the description below, each of the pixels is associated uniquely with a row assignment to one of the twenty rows and a column assignment to one of the twenty columns. Thus, each of the 400 pixels associated with the structure illustrated in FIG. 1 has a unique row and column address which allow it to be individually driven/controlled with the video information associated with its position on the raster. Resolution may also be 64×48, 128×96, 320×240 (QVGA), 640×480 (UGA), 800×600 (SVGA), 1024×760 (XGA), etc.

In addition to the above-discussed structure for coupling signals to the face electrodes and the spiral electrodes of the pixels, the pattern of printed circuit 14, whether it be made of copper or indium tin oxide, may also optionally include a coupling conductor 44 electrically connected to a Faraday cage source connector contact 46 by a conductive fixed electrode strip 48.

Figure 2:
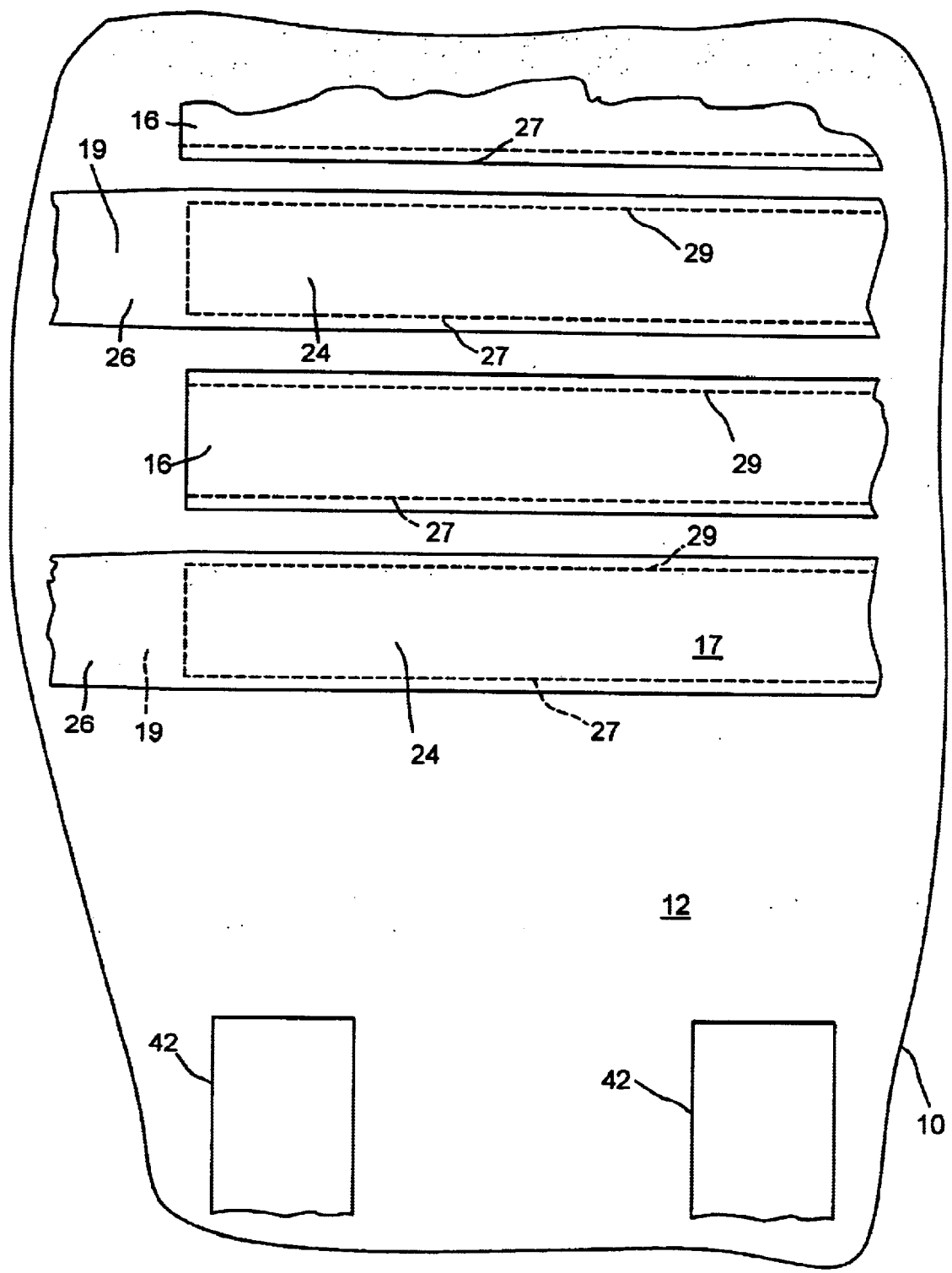
FIG. 2 illustrates a portion of the top surface of the substrate illustrated in FIG. 1.

Turning to FIG. 2, a portion of the top surface of substrate 10 is illustrated. Likewise, portions of some of the conductive fixed electrode strips 16 and 24 are also illustrated. It is noted that the distance between conductive fixed electrode strips 16 and conductive fixed electrode strips 24 is exaggerated, and need only be as large as the technology requires that they be in order to perform the process steps detailed below in the construction of the inventive display. Likewise, connector spans 26, which perform the function of coupling drive signals to their respective rows of pixels, are also illustrated. FIG. 2, taken in conjunction with the subsequent figures illustrating, in substantially the same scale, the manufacturing steps for making an electromechanical raster, enables facile comprehension of the method of the present invention.

Figure 3:
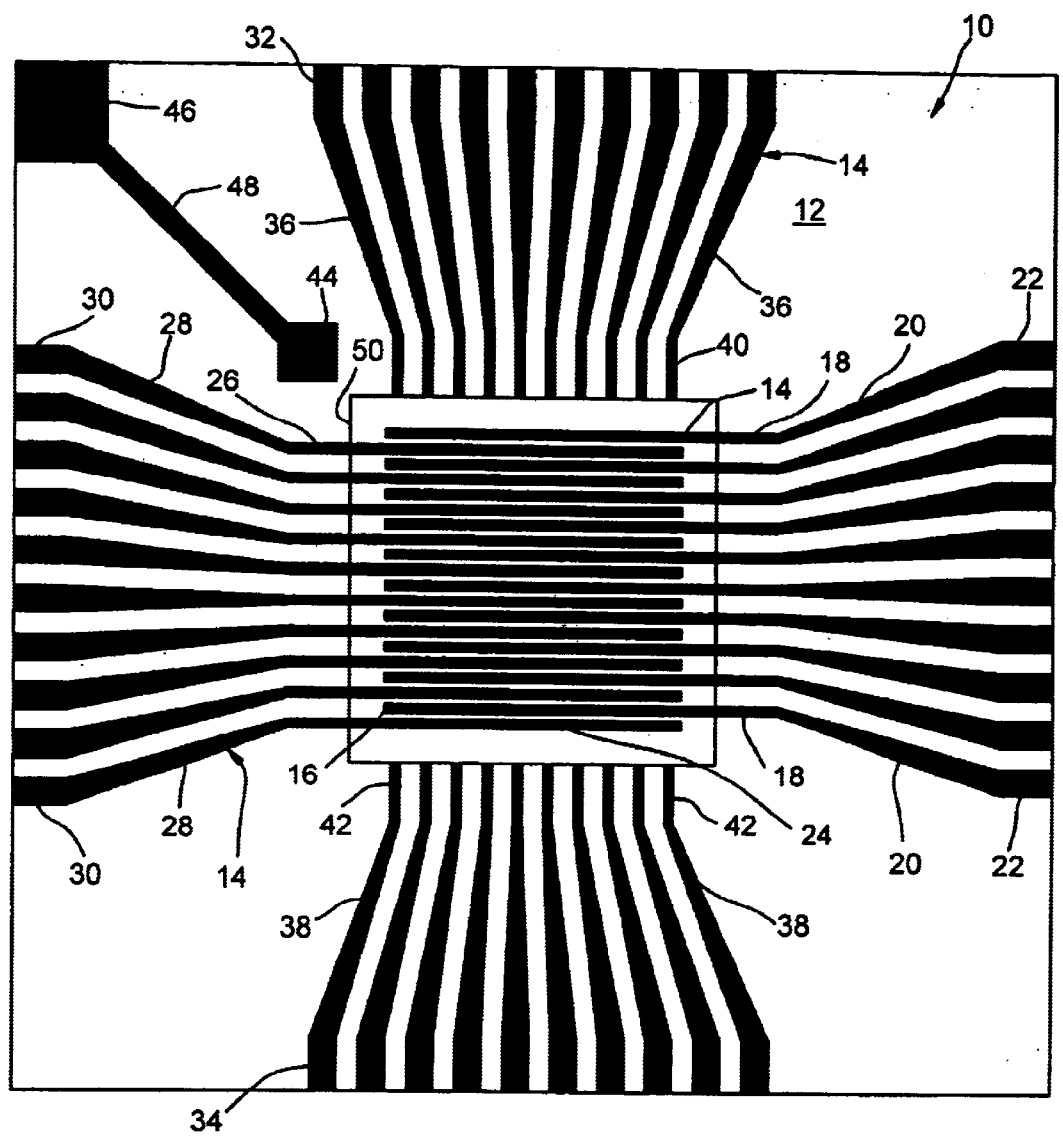
FIG. 3 illustrates the covering of a portion of the workpiece surface with a layer of dielectric material.

Turning to FIG. 3, which is drawn to the same scale as FIG. 1 and in which broken lines indicate elements which underlie other elements and are covered from direct view (a convention which is followed in subsequent figures illustrating other process steps), the next step in the manufacture of the matrix display system of the present invention is illustrated. In particular, after the conductive pattern illustrated in FIG. 1 has been deposited, it is necessary to cover a portion of the printed circuit 14 with a layer of dielectric material 50. Dielectric layer 50 may be made of any suitable material, whether it be relatively rigid or flexible. Typically such material may be polypropylene, teflon (FEP), polyethylene, polystyrene, or any clear (in the case of a backlit display), non-polar material, and have a thickness on the order of a small fraction of a millimeter Dielectric layer 50 may be maintained in position through the use of adhesive positioned at the periphery of dielectric layer 50, but not in the center of the image, owing to the polarity of the adhesive causing dielectric absorption.

Alternatively, thermal bonding may be used without adhesive.

As an alternative to the use of a separate dielectric layer 50 which is (laminated) to the substrate 10, it is also possible to achieve the desired introduction of an insulative material into the structure of the pixels by substituting, for dielectric layer 50, a layer of dielectric applied using an aerosol technique, a sputter deposited layer of dielectric material, or the like. In the event a polar material is used, the drive system must provide an alternating current.

It is noted that layer 50, whether it be paint, a glued-on plastic film, or sputtered dielectric is also selected for its optical characteristic. For example, in the case of a back-lit display, layer 50 would be selected from a range of materials which are transparent, such as a plastic film, aerosol-applied polyethylene, or the like.

In the case of a front-lit display, dielectric layer 50 would be selected for particular reflective characteristics. For example, dielectric layer 50 could be made of red dielectric paint having a suitable dielectric characteristic, i.e. a dielectric material or mixtures loaded with pigment.

Generally, in the case of all such materials, dielectric layer 50 should be thin enough to allow the electrostatic field and forces to operate pixels at relatively low voltage, in accordance with known device characteristics for such electromechanical display pixels.

Figure 4:
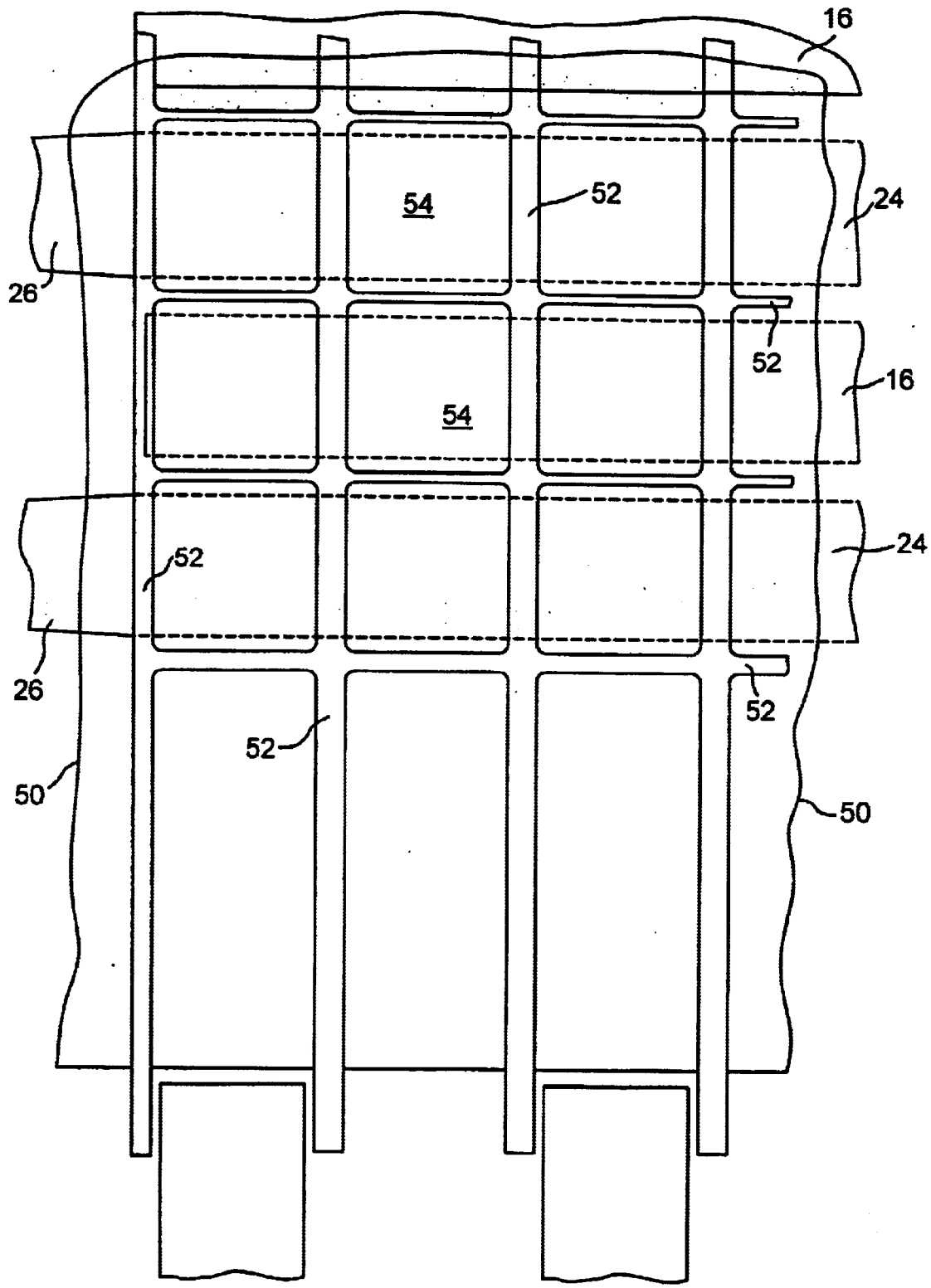
FIG. 4 illustrates the application of adhesive to the workpiece.

As illustrated most clearly in FIG. 4, the next step in the fabrication of the inventive matrix display system in accordance with the present invention is the application of adhesive 52. The adhesive 52 is applied to the coating of dielectric material 50 in a pattern which results in a matrix of areas 54 which are surrounded by adhesive. Areas 54 correspond to the areas which will be taken up by the completed pixels. More particularly, one pixel will be associated with each of the areas 54 and will be surrounded by a perimeter of adhesive which maintains the physical integrity of the fabricated pixel.

Because adhesive 52 is in the active area of the matrix display, it is necessary that adhesive 52 be insulative after it has cured by drying, or any other mechanism which it employs to cure. Adhesive 52 may also be applied as simple stripes.

Figure 5:
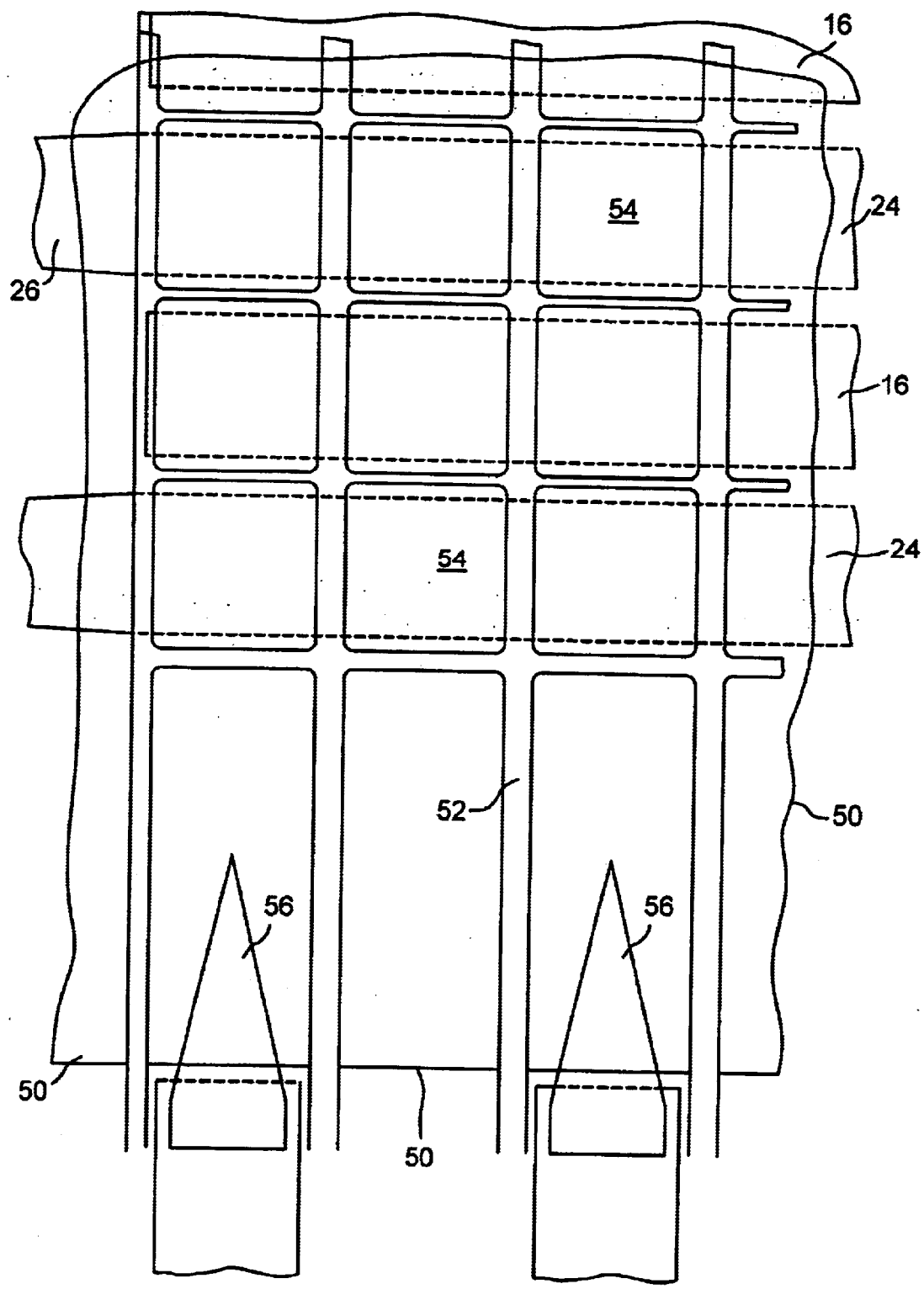
FIG. 5 illustrates the application of conductive adhesive patches.

After non-conductive adhesive 52 has been applied, the next step in the fabrication of the inventive matrix display system is the application of conductive adhesive patches 56. to each of the connection spans 40 and 42, in the manner illustrated in FIG. 5.

Figure 6:
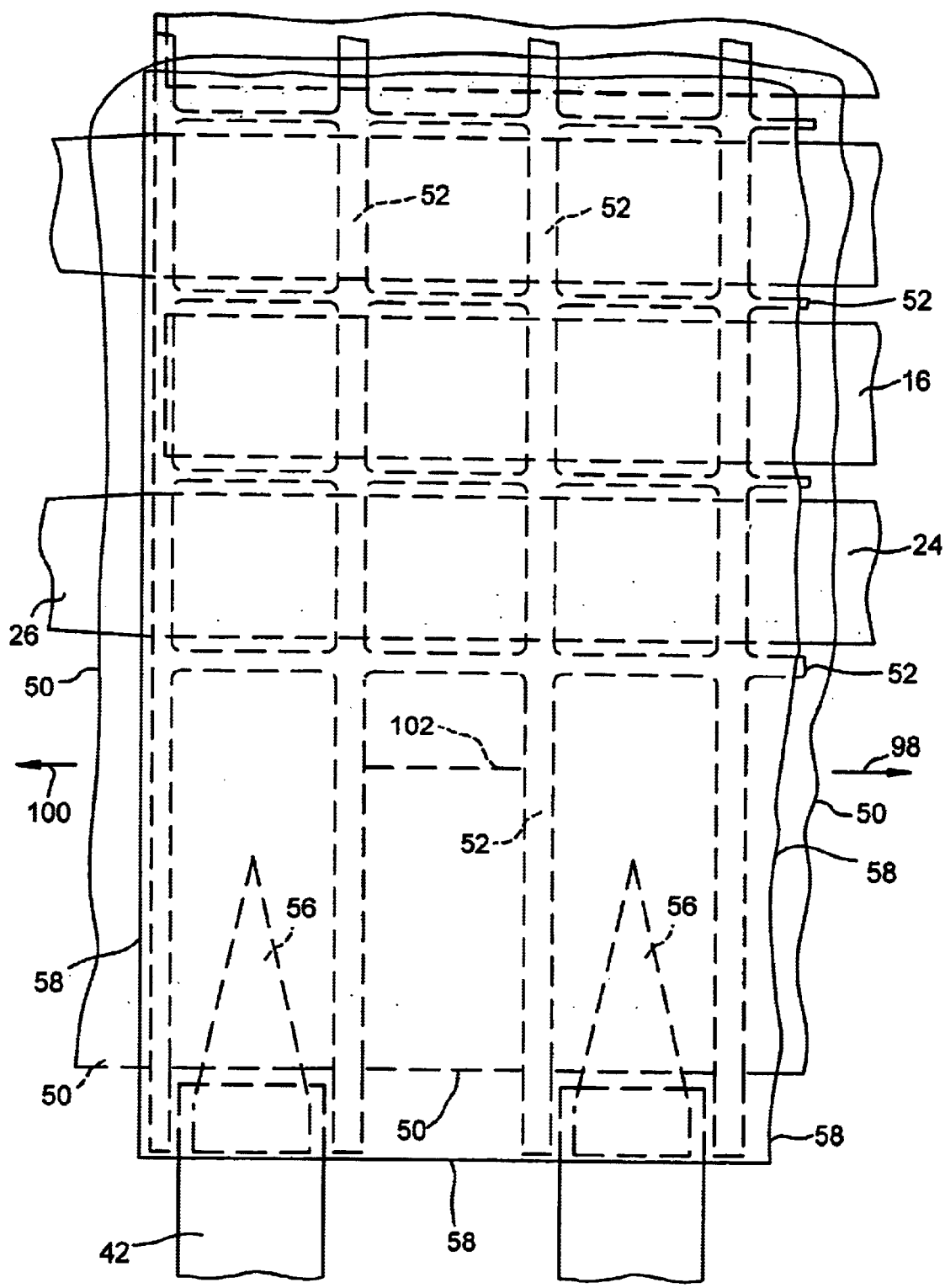
FIG. 6 illustrates the adhering of a sheet of metalized plastic.

After conductive adhesive patches 56 have been applied, the next step is the adhering of a sheet 58 of metalized plastic as illustrated in FIG. 6. Area 54 can have a large range of sizes depending upon the size and resolution of the display. It can be as small as 10 mils$^2$ or as large as 500 mils$^2$, or larger or smaller. Sheet 58 is made of PEN, PET or a variety of other polymeric materials having a thickness usually in the range of 1 to 5 or thicker or thinner.

Metalized plastic sheet 58 is, in accordance with the preferred embodiment of the invention, coated with a thin layer of metal, such as aluminum. The coating has a thickness of 100 A° to 1000 A° or thicker or thinner.

When sheet 58 is applied to adhesive 52, it is oriented with the metal layer facing the substrate 10 and dielectric coating 50. Thus, the distance between the metal layer and conductive fixed electrode strips 16 and 24 is the thickness of the dielectric material 50. Because this thickness is so small, the electric fields between the metalized layer and the conductive fixed electrode strips 16 and 24 is strong enough to operate the pixel electrostatically.

The structure resulting from the above process steps, thus comprises a metalized plastic sheet with a metal layer insulated from the conductive fixed electrode strips 16 and 24 but electrically coupled by conductive adhesive patches 56 to connection spans 40 and 42. For the sake of clarity of illustration, conductive adhesive patches 56 are illustrated in broken lines in FIG. 1, although they are not applied until later in the manufacturing process.

Figure 7:
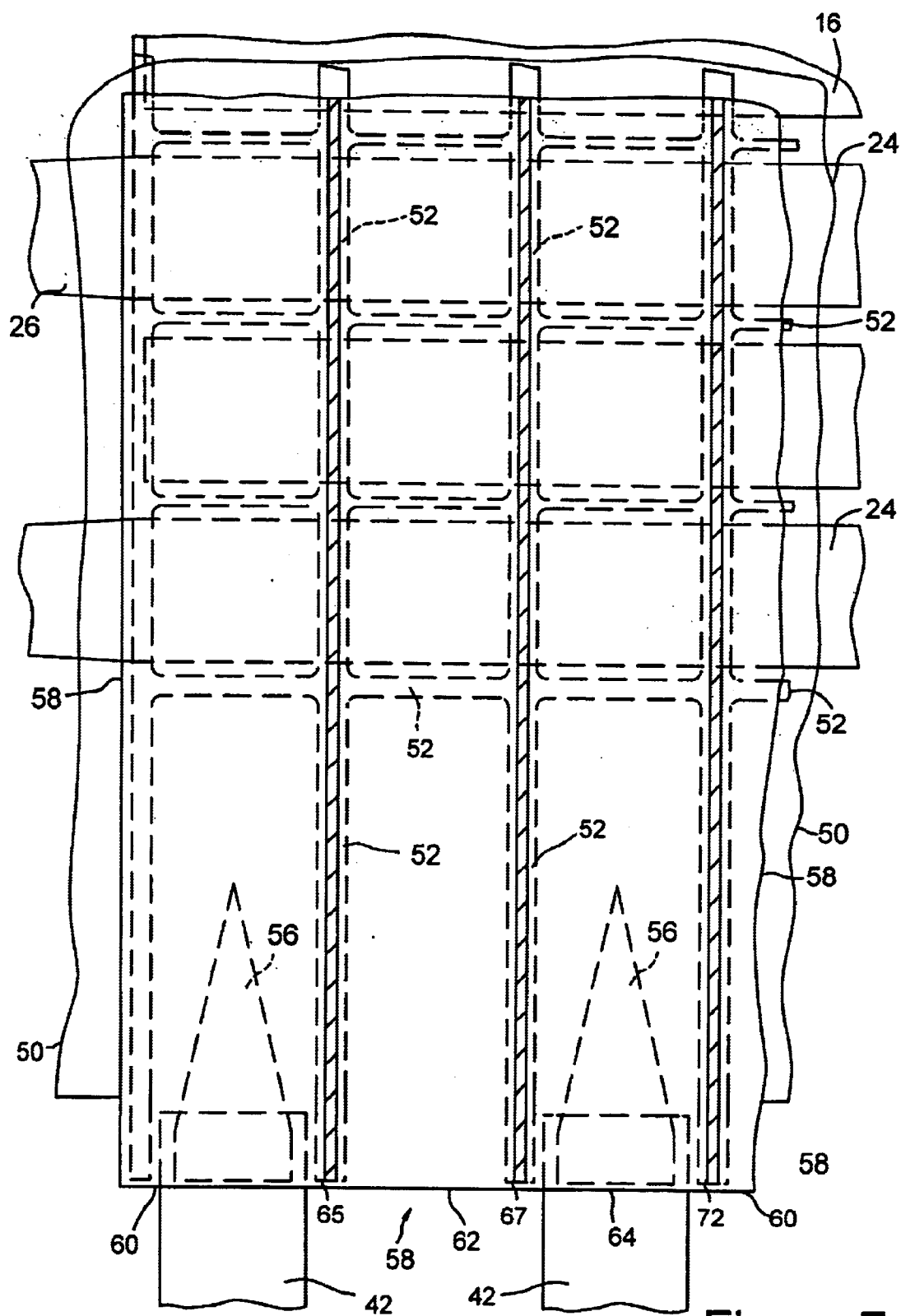
FIG. 7 illustrates the cutting (for example by or the use of a laser) of metalized plastic sheet 58 into a plurality of column-oriented electrode-defining strips.

Turning to FIG. 7, the next step in the manufacturing process is illustrated. This step involves the cutting of metallized plastic sheet 58 into a plurality of column-oriented electrode-defining strips 60, 62, 64 and 66. Although cutting may be done mechanically using a blade which is controlled precisely to insure that only the desired depth of cut will be implemented, or by photolithographic techniques, in accordance with the preferred embodiment, such cutting is achieved using laser ablation.

More particularly, the metalized plastic sheet 58 is defined into a plurality of strips 60 through 66, by the removal, using a laser, of portions 65, 67 and 69, as illustrated in FIG. 7. For clarity of illustration, portions 65, 67 and 69, that have been removed, are illustrated by shading in FIG. 7.

As can be understood from the above description, each of the areas 54 may now be addressed electrically and individually using the respective conductive fixed electrode strips 16 or 24 and a respective one of strips 60 through 66. Accordingly, a plurality of active electrodes 68 through 90 (which each define a pixel) may be cut in electrode-defining strips 60, 62, 64 and 66. As illustrated most clearly in FIG. 8, each of the active electrodes 68 through 90 are defined by three cuts 92, 94 and 96. Cuts 92, 94 and 96 may also be made using any suitable technique, such as mechanical cutting with a knife blade, photolithographic etching, or by ablation of portions of the strips using a laser.

Figure 8:
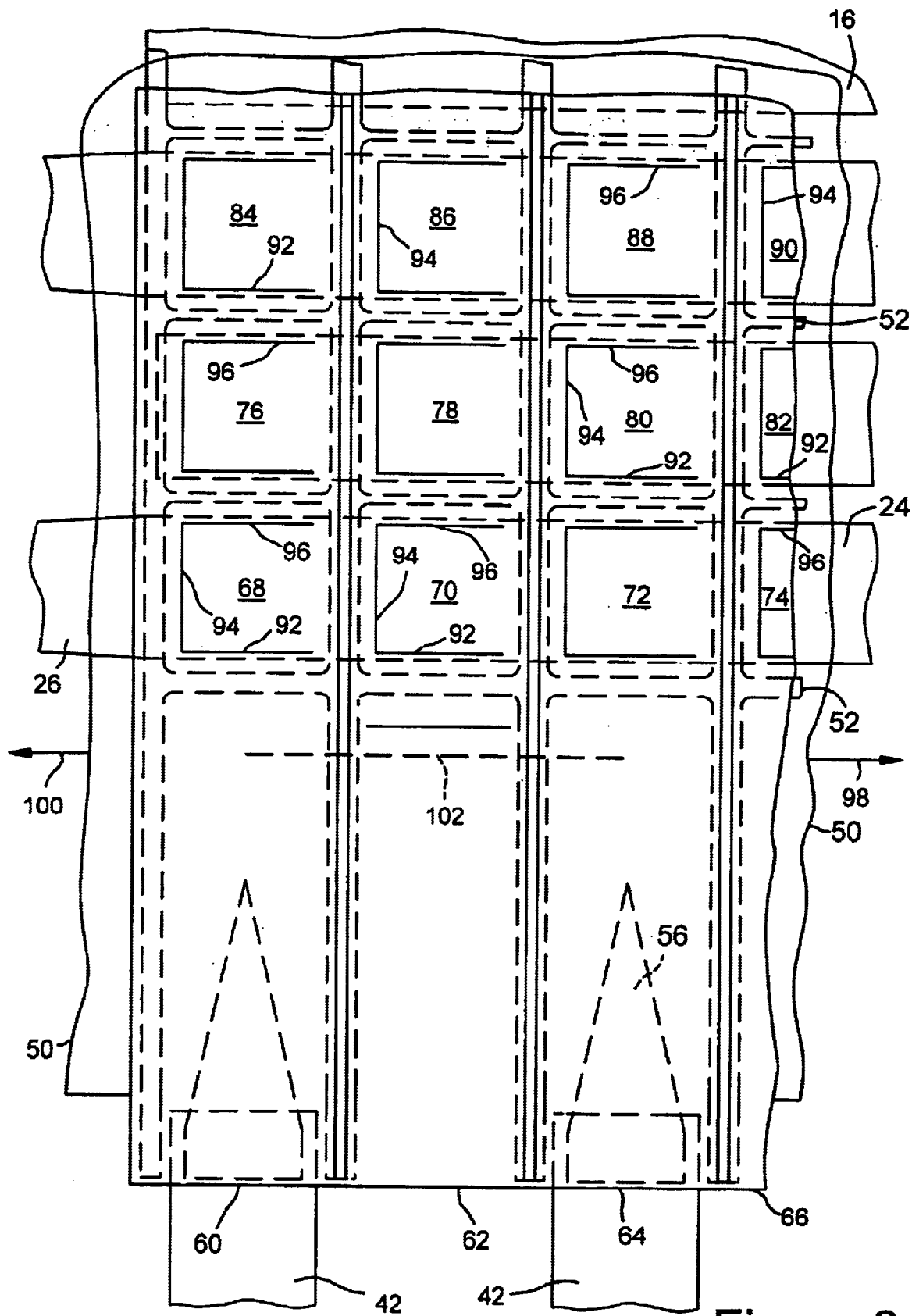
FIG. 8 illustrates the definition of the active electrodes.

It is noted that for purposes of illustration, the invention has been described in connection with a limited number of pixels. Of course, the portion of the matrix display constructed accordance with present invention and illustrated in, for example, FIG. 8 is merely a portion of a matrix comprising not merely the dozen pixels illustrated FIG. 8, but approximately 400 pixels laid out with the pattern illustrated in FIG. 8. This number may also be much higher. The structure of all the pixels is substantially the same, and repetitive illustration is not practical or useful. Thus it will be understood that the discussion with respect to, for example, active electrodes 68 through 90 applies to the fabrication of all the or anything in between, electrodes in the system and the drive circuitry associated with them and illustrated in, for example, FIG. 1.

Likewise, it is noted that the connective driving structures illustrated in large-scale in, for example, FIGS. 4 through 9 at the left and bottom of the Figures is repeated at the right and top of the inventive matrix display system.

After cuts 92, 94 and 96 have been made for all the pixels in the matrix display panel, the next step is to heat the assembly illustrated in FIG. 8 in an oven at approximately a temperature, which is near the glass point for the particular polymer used, for a period of time ranging from about one minutes to 1 hr Because the last tentering step in the formation of the polymer tends to stretch out the polymeric molecules of the plastic in sheet 58 in the direction on imaginary line 102, heating sheet 58 will tend to cause the tentered and stretched out molecules to shrink in the outward-facing top surface of plastic sheet 58. However, the inside surface of plastic sheet 58 is coated with a metal coating which does not experience a permanent dimensional change when heated. The result is to cause the edge of the active electrodes adjacent cuts 94 to roll up and move to the right of the matrix illustrated FIG. 8.

At this point, the construction of the active members of the inventive matrix display is completed. With the active electrodes rolled up, a first optical effect is achieved. Each of the active electrodes may be actuated to unfurl to achieve another optical effect. Unfurling can be achieved by applying a voltage between the active metal electrode which one wishes to unfurl and its corresponding fixed electrode strip. The underlying portion of the respective conductive fixed electrode strip acts as the fixed electrode of the electromechanical pixel associated with each of the active electrodes. Likewise, active electrodes may be unfurled partially. Such partial unfurling can be achieved using lines of triangular electrodes (FIG. 16) as the fixed electrodes.

As will be discussed in detail below, the application of an electrical potential between the respective one of contact edges 30 or 22 (to designate a row address) and the respective one of contact edges 32 or 34 (to designate a column address) will result in unfurling of a desired active electrode. Selective and, optionally on proportional, unfurling of the active electrodes in various patterns will result in the inventive display system presenting to a viewer a desired display pattern. For example, in FIG. 9, active electrodes 68, 72, 76, 78, 86 have not been activated, and, accordingly, displaying the optical characteristic of dielectric material 50. As noted above, this may be "red paint". Alternatively, dielectric material 50 and conductive fixed electrode strips 16 and 24 may be transparent resulting in the transmission of light from behind the display to a viewer.

In the case of unfurled active electrodes 70, 74, 80, 82, 84, 88 and 90, the optical characteristic of the active electrode will be seen by a viewer. Since, metalized electrodes do not transmit light, any light from a back-lighting source will not pass through an unfurled active electrode, resulting in a contrast with electrodes which are not activated and thus still rolled up.

Figure 9:
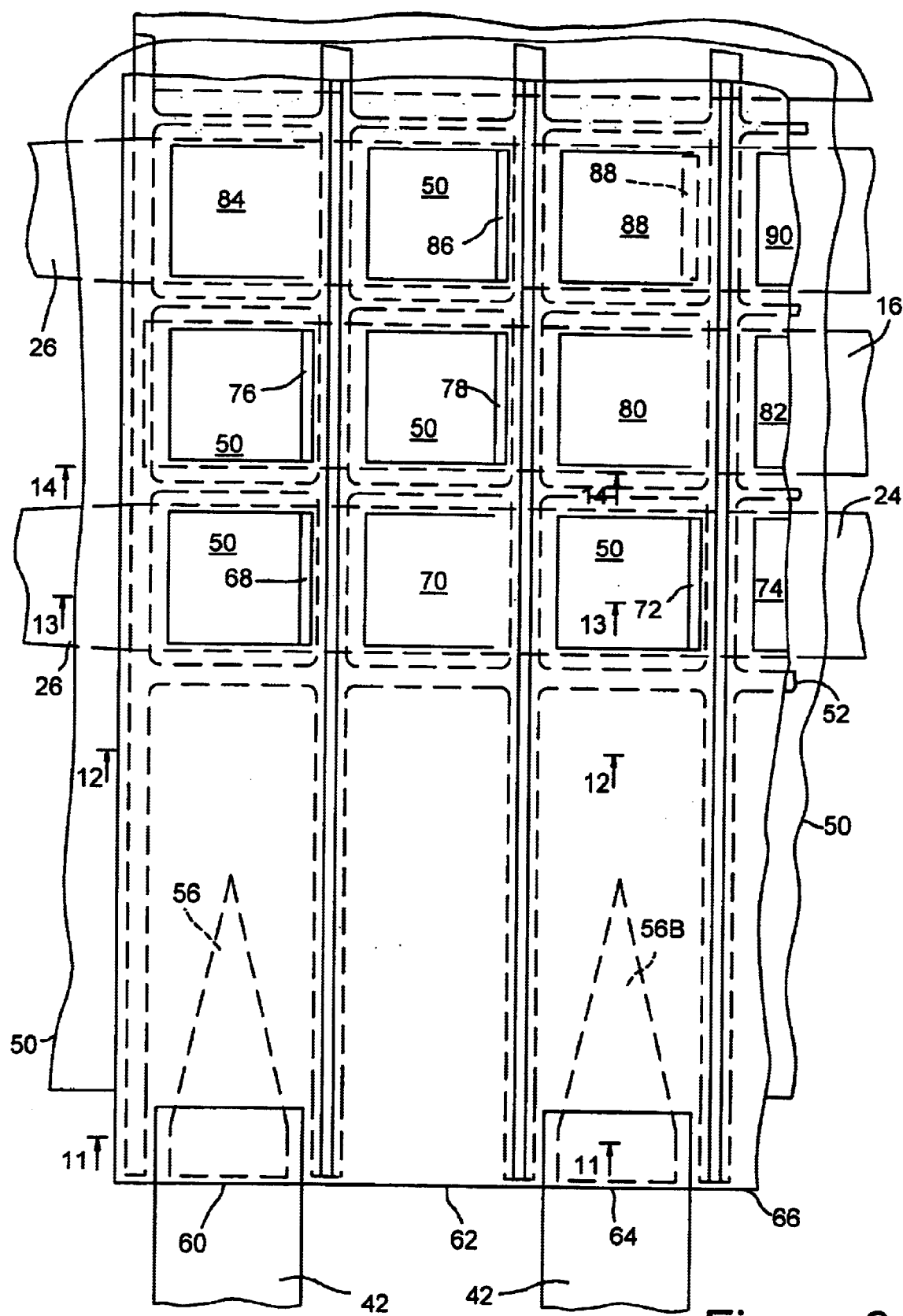
FIG. 9 illustrates, with underlying elements shown in phantom lines, a finished matrix with only a portion of the electrodes actuated.
Figure 10:
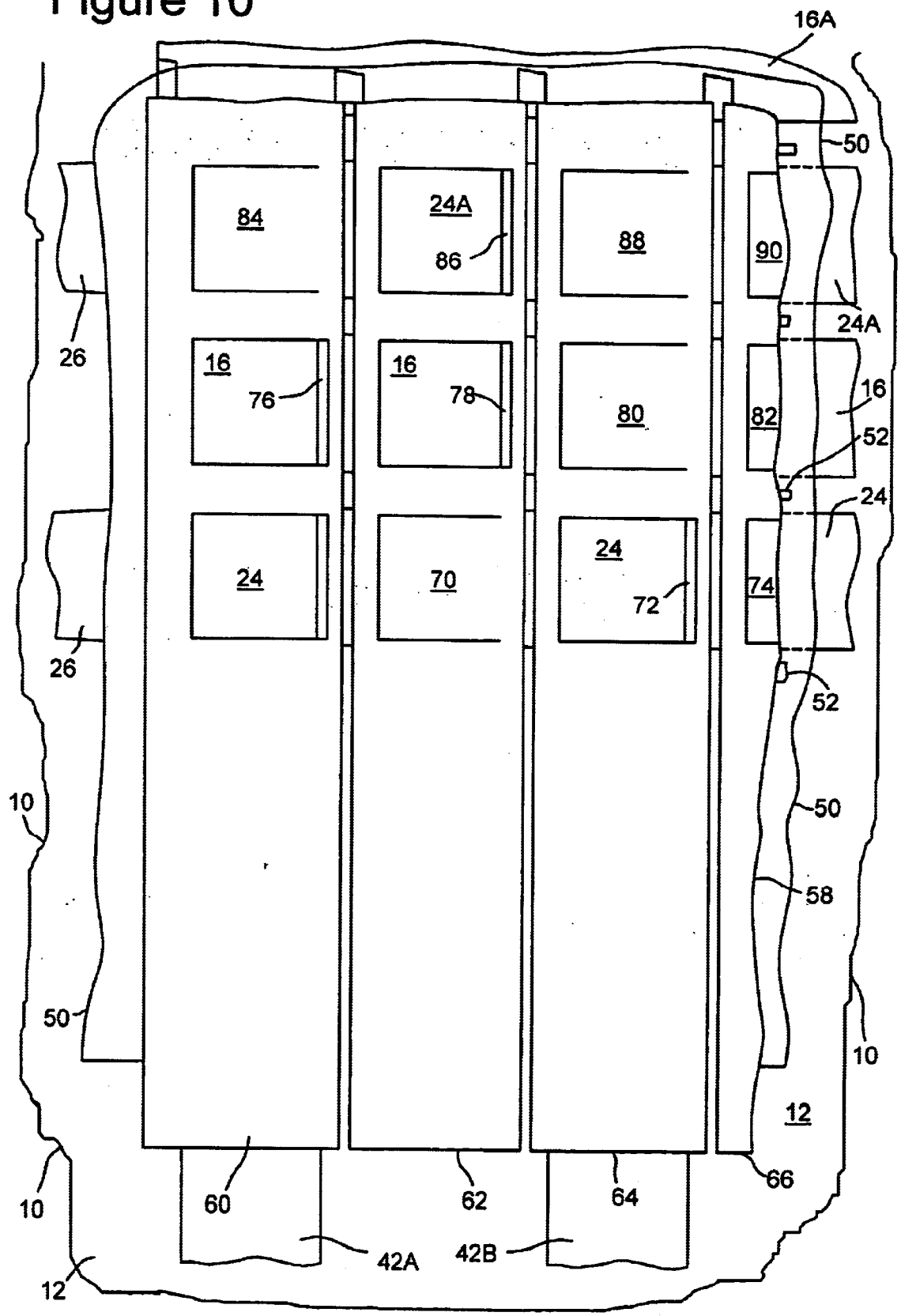
FIG. 10 illustrates the appearance of a finished matrix.

Operation of the inventive system may be understood with reference to FIG. 10 which differs from FIG. 9 inasmuch as only the topmost layer of the inventive matrix display system's structure is illustrated.

As can be understood from the discussion which follows with reference to FIG. 1 taken with FIG. 10, if it is desired to actuate a pixel by driving the respective active electrode 88 so that it is unfurled as is illustrated in FIG. 10, an electric potential is applied between connection span 42b and conductive fixed electrode strip 24a.

This is achieved by applying a first voltage to contact edge 34b. This voltage is carried by converging span 38b to connection span 42b. Contact edge 34b, converging span 38b and connection span 42b are all integral with each other and thus form a current path.

Figure 11:
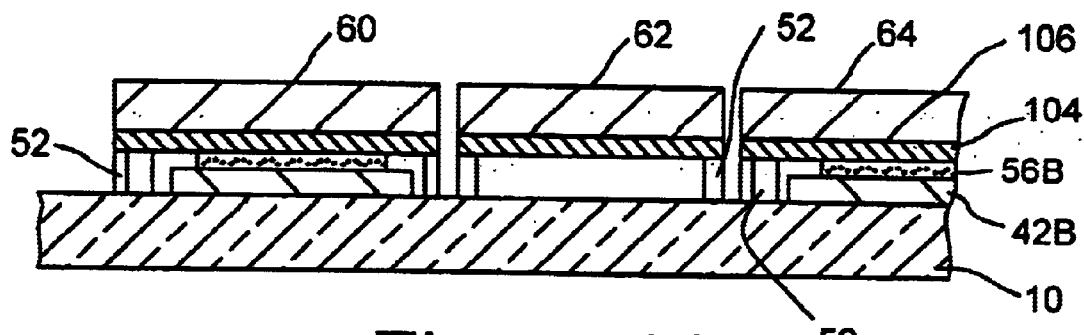
FIG. 11 is a cross-section illustrating the structure of the electrodes along lines 11—11 of FIG. 9.

The next part of the circuit is conductive adhesive patch 56b, as illustrated in FIG. 9 and FIG. 11. Conductive adhesive patch 56b couples the driving voltage from connection span 42b to the underside metal layer 104 of strip 64. Strip 64 defines the active electrodes of all pixels in its respective column as illustrated most clearly in FIG. 10. As described above, strip 64 is made of a plastic layer 106 and metal layer 104 adhered to plastic layer 106. Strip 64 is maintained in position on substrate 10 by adhesive 52 and conductive adhesive patch 56b. Thus, the voltage coupled to contact edge 34b is carried to strip 64.

Figure 12:
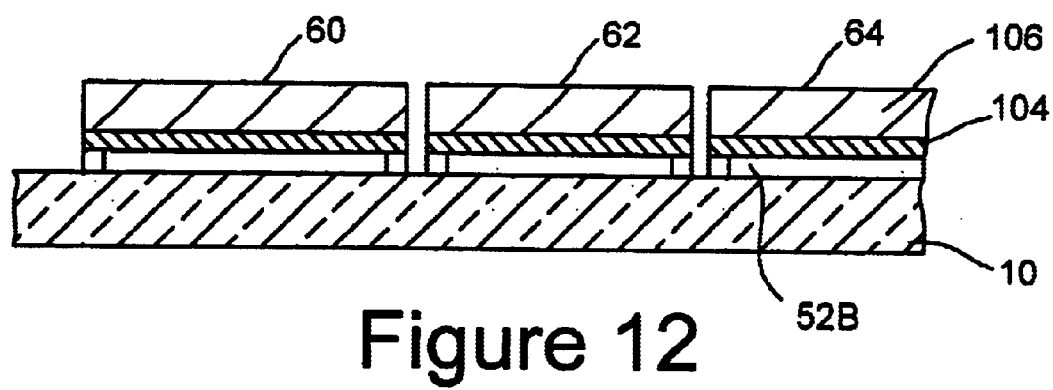
FIG. 12 is a view along lines 12—12 of FIG. 9 illustrating the construction of the inventive system.
Figure 13:
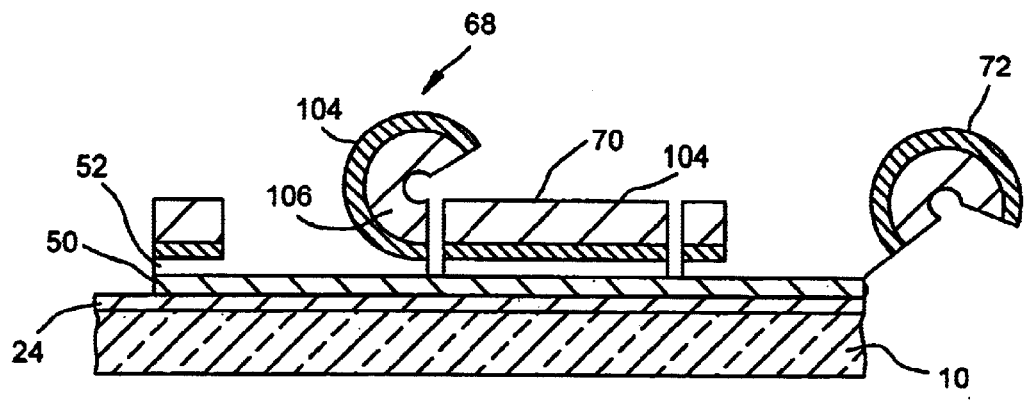
FIG. 13 is a cross-section of the inventive structure illustrated along lines 13—13 of FIG. 9.

As is illustrated in FIG. 12, strisp 64 comprising plastic layer 106 and metal layer 104 continue along the surface of the inventive matrix display, secured by adhesive 52 to form the active portion of the pixels. For the sake of a clear understanding of the structure of the inventive system, a cross-section has been taken through that portion of the matrix display which includes the pixel associated with active electrodes 68, 70 and 72, as illustrated in FIG. 13. It is noted that in FIG. 13, as in FIGS. 11, 12 and 14, thicknesses have been greatly exaggerated for clarity of illustration. The result is that curled electrodes 68 and 72 are greatly exaggerated and distorted. In practice, they could take a variety of shapes ranging from tightly rolled into a tight spiral and appear to the naked eye as a fine rod of circular cross-section, to being raised verically off the substrate with a slight roll or curve.

When in a tight spiral, so small is the cross-section that, at normal viewing distance, a curled up electrode will be almost invisible to the naked eye. Because the material, of which the active electrodes is made, it is exceedingly thin, relatively small electrostatic forces exist (when a potential is applied to a pixel to operate it by causing the shutter to unroll) between their respective metal layers 104 and conductive fixed electrode strips 16 and 24. The existence of the electric field between conductive fixed electrode strip 24 and metal layer 104 of active electrode 70 is made possible through the insulative effect of dielectric layer 50, as illustrated in FIG. 13.

It is also noted that the diagrammatic representation of pixels in FIG. 13 shows metal layer 104 as being slightly separated from dielectric insulative layer 50. It is, however understood that, in practice, these two elements are generally in contact with each other.

Figure 14:
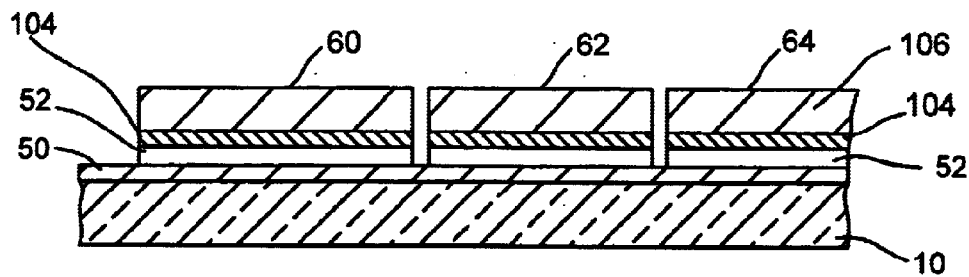
FIG. 14 is a view in cross-section along lines 14—14 of FIG. 9 illustrating the construction of the inventive matrix pixels.

An understanding of the structure of the pixels in the inventive matrix display system can be further understood from FIG. 14 with shows the functioning of adhesive layer 52 to secure portions of strips 60, 62 and 64 to substrate 10 by adhering their metal layers 104 to the electric insulative layer 50.

In an actual large scale working system, the active area of an active electrode may have a length and width of 2 cm, many hundreds of times greater than the thickness (1 to 10 cm) of the material disposed on substrate 10. However, in a smaller system, the thickness may be 1–10 microns but length and width may be 250 microns.

In turn, strip 64 has a metal layer 104 which carries voltage along its length to all active electrodes all wall pixels in its respective column. Because the curled up active electrodes, such as electrodes 70, 80 and 88 (FIG. 10), all are cut from the same sheet 58 of metalized plastic, and because the lengthwise edges of strip 64 are uninterrupted, these lengthwise edges of the metalized layer on the strip act as an electrical circuit to couple voltage to the metalized layer on all of the active electrodes 70, 80 and 88, because the metalized layer on all of those active electrodes is integral with and thus electrically connected to all other parts of the metalized layer associated with strip 64.

Conversely, because strips 65, 67 and 69 (FIG. 7) have been cut from plastic sheet 58, the columns associated with strips 60, 62 and 64 are electrically isolated from each other and can be operated independently. Thus, means are provided in the structure made in accordance with the present invention to activate one or more columns of active electrodes.

However, in order to activate a pixel to unfurl an active electrode, in accordance with the present invention, it is necessary to apply a voltage to the active electrode, where that voltage connected to the active electrode has a magnitude different from the magnitude of the voltage connected to the respective fixed electrode (formed by the respective portion of conductive fixed electrode strip 24a underlying the pixel associated with active electrode 88 in the present example of operation).

As is illustrated most clearly in FIG. 1, activation of the pixel associated with active electrode 88 is achieved by the application of driving voltage to contact edge 30a. Contact edge 30a, in turn, couples the voltage to converging span 28a, with which it is integral, having been formed by etching of the same layer of material to form printed circuit 14. Converging span 28a, in turn, couples the voltage to connector span 26a. Finally, the voltage potential is coupled by connector span 26a to conductive fixed electrode strip 24a.

The result of the application of different voltage potentials to conductive fixed electrode strip 24a and strip 62 is the generation of an electric field between active electrode 88 and underlying portions of conductive fixed electrode strip 24a. This electric field extends through dielectric material 50, and causes active electrode 88 to move from the curled up state (indicated at 88 in FIG. 9) to the unfurled position illustrated in, for example, FIG. 9, toward the maximum capacitance, flat position, illustrated in solid lines.

This may be better understood with reference to other pixels in FIG. 9. In particular, an electrode in another pixel in the curled up state, namely, active electrode 72, is illustrated in the diagram. Active electrode 72 is exceedingly thin and may be elevated from the substrate.

Figure 15:
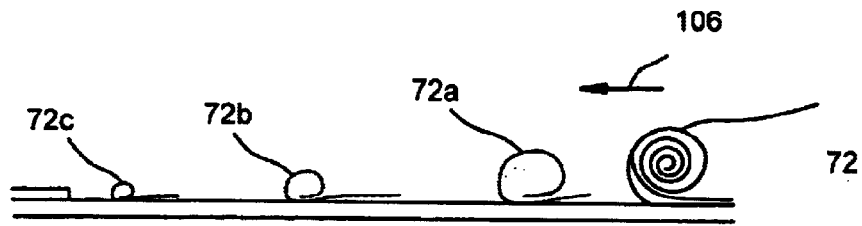
FIG. 15 illustrates active electrode cross-sectional structure.

Again, reference is made to FIG. 13 illustrating curled up active electrodes 68 and 72, and unfurled and activated electrode 70. While the above drawings are exaggerated, as discussed above, the same are useful for a conceptual understanding of operating positions of the electrodes illustrated in FIG. 10. A still exaggerated but somewhat more realistic illustration of active electrode crosssectional structure is found in FIG. 15. In this schematic representation of the movement of an active electrode, the active electrode 72 is illustrated in solid lines and has a particular crosssectional diameter. As the active electrode 72 is activated, it tends to unroll and move in the direction illustrated by arrow 106.

After a period of time it assumes the position shown in dashed lines as active electrode 72a. It is noted that after unrolling partially, the electrode has a somewhat smaller diameter. Likewise, as it continues to unroll, and reach the position illustrated in dashed lines by electrode 72b, its diameter is yet further reduced. Further advancement in the direction indicated by arrow 106 to the position illustrated by active electrode 72c sees yet a further reduction in active electrode diameter.

It is noted that to obtain shades of gray, in the case of a reflective display, or to vary the transmissivity with which colored or white light is transmitted, proportional control of the amount of unfurling to result in stable electrode positions such as that illustrated by active electrodes 72, 72a, 72b, 72c, and all positions in between is possible using, for example, a fixed electrode formed by the conductive fixed electrode strips in the shape of a triangle.

Figure 16:
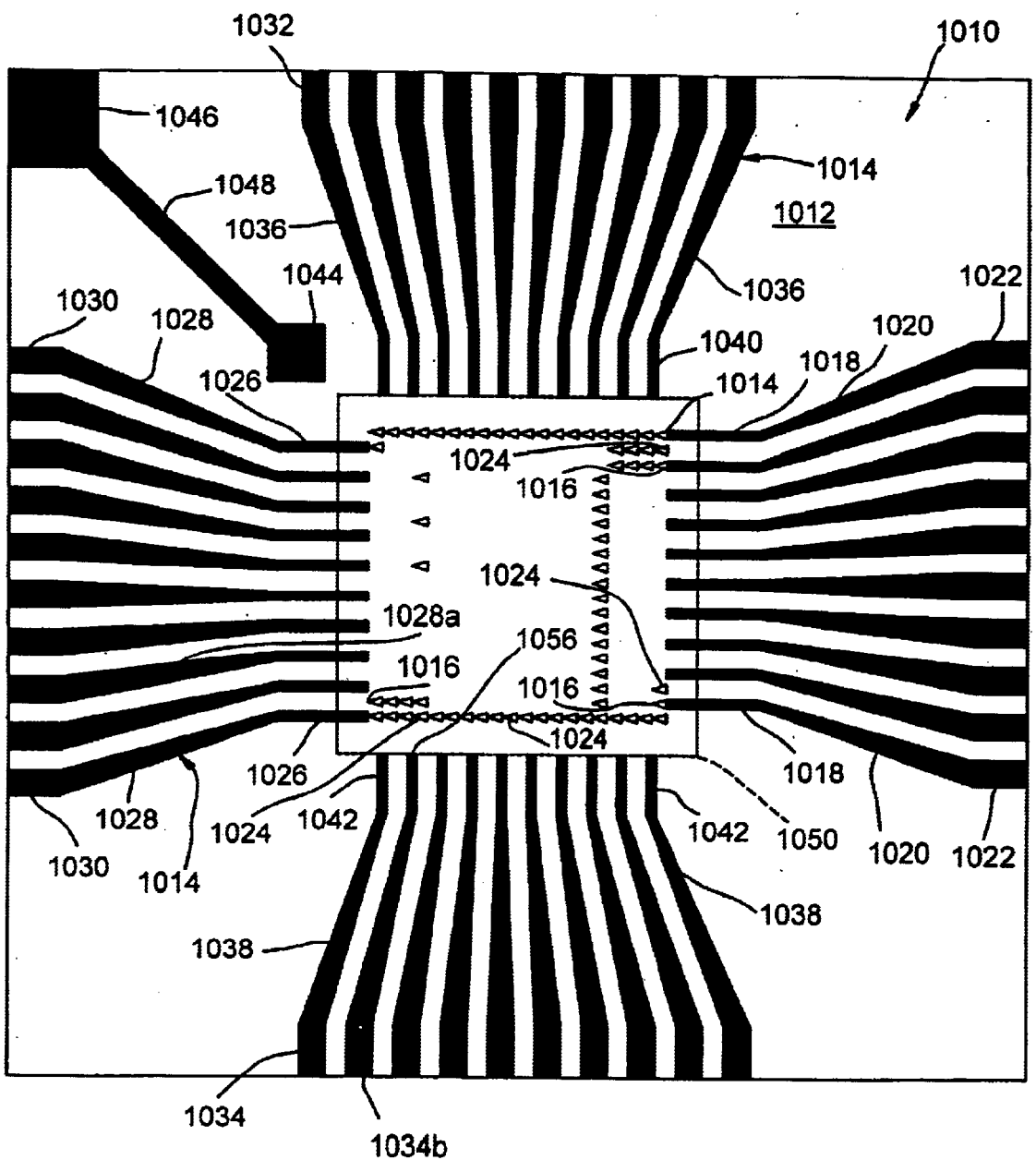
FIG. 16 is a view similar to FIG. 1 illustrating an alternative embodiment with triangle shaped electrodes.

Such an arrangement is illustrated in FIG. 16 which is a view corresponding to FIG. 1 of an alternative embodiment in which corresponding elements have been numbered with numbers one thousand higher than the corresponding elements of the FIG. 1 embodiment. In the FIG. 16 embodiment, however conductive fixed electrode strips 16 and 24 have been replaced by triangular electrodes 1016 and 1024. Using such a system, it is possible to selectively control the degree of actuation and thus the transmissivity or the reflectivity of the pixel.

In accordance with the present invention, it is possible also to have what is, in effect, a full-color light-emitting display. In such a device, light-emitting pixels are arranged in successive alternating columns or rows of red-emitting, blue-emitting and green-emitting pixels to form successive stripes of the three colors customarily used in light emitting displays. Such a color assignment is illustrated by the letters R, B and G in FIG. 16. In such arrangement, about a third of the 400 triangular fixed electrodes will emit the color red, while another third will emit the color blue, and the remaining third will emit color green.

Figure 17:
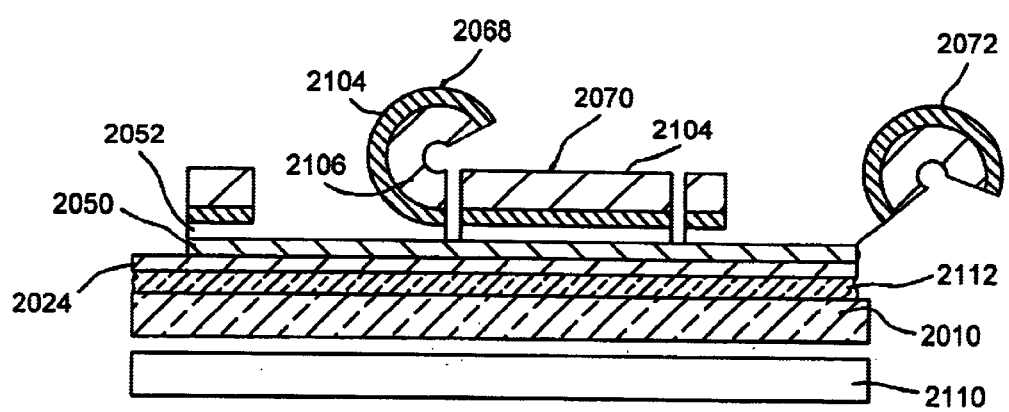
FIG. 17 illustrates another embodiment of the invention which incorporates color filter material between the substrate and the fixed electrodes.

Such emission can be achieved by incorporating a dye into an otherwise transparent fixed electrode (which is lit from the back) and using a transparent dielectric layer 1050. Alternatively, as is shown in the embodiment of FIG. 17, it is possible to incorporate a strip of color filter material 2112 between the substrate 2010 and the fixed electrodes 2024 and 2016 in order to filter white light output by back light source 2110. The colored strip filters may be produced by printing the color filter directly on the substrate or on an electrode, or by attaching a resin sheet segment dyed with the desired colors, or by sputtering a colored resin surface directly onto an electrode. Back light source 2110 may be an array of cold cathode fluorescent tubes or other light sources whose output is sent to a diffuser or in a conventional manner.

In accordance with a preferred embodiment of the inventive method and structure, a full VGA (640 pixels by 480 pixels) display is provided. The display is constructed on a glass substrate 10 and includes 480 fixed electrode strips 16 made of indium tin oxide (ITO). Each electrode strip 16 is adapted to be driven by its respective conductive connector span 26, respective converging span 28, and respective row driver contact edge 30.

The VGA display is constructed by starting with a relatively rigid pane of glass having a length of about 45 cm (about 18 inches), a width of about 35 cm (about 14 inches) and a thickness of about 0.11 mm (about 0.0043 inches), and covered, on one side, first with a silicon dioxide frit. The silicon dioxide frit, is, in turn, covered with a layer of indium tin oxide having a conductivity of 100 ohms per square. Such glass, covered with the silicon dioxide frit and the overlayer of indium tin oxide 17 (FIG. 2), is commercially available in the above-described form from Donnelly Applied Films Corp. of Boulder, Colo.

The next step in the process is deposition of a layer of chrome gold layer 19, as shown in phantom lines in FIG. 2, over the entire surface of the indium tin oxide on the pane of glass. Such deposition is done by a conventional evaporation process. In accordance with the invention, chromium and gold are deposited substantially simultaneously to build up a layer of chromium and gold patches which overlie the surface and each other in a substantially random configuration.

The chromium is used for adhesion, while the gold provides excellent conductivity. A conventional chromium/gold layer of the type typically used to form conductive members in the fabrication of the liquid crystal display systems is employed.

After the chromium/gold has been deposited over the indium tin oxide layer, a pattern of the type illustrated in, for example, FIG. 1, but having the number of fixed electrode strips 16 required for a VGA display, is etched. Etching is done to remove the chromium/gold layer in the selected areas. The silicon dioxide frit remains substantially unaffected by the etching process. Thus, a three layer structure comprising an underlayer of silicon dioxide, a middle indium tin oxide layer and a top layer of chromium/gold and taking a pattern of the type illustrated in FIG. 1 remains on the pane after the etching process.

Removal of the chromium/gold layer and the indium tin oxide layer is performed by Standard photolithography methods.

In accordance with the preferred embodiment of the invention, the active area of the display substrate should be driven by a plurality of conductors. Accordingly, the indium tin oxide layer must next be removed from the area outside the active area of the display and in between electrode strips 16. For clarity of illustration, it is noted that the active area, that is the area taken up by electrode strips 16 and 24, defines substantially a square in FIG. 1. Of course, in the instant example, the active area will take the shape of a rectangle, as is customary in the case of VGA displays. The desired transparency of the active area of the display was achieved by removing the chromium/gold from electrode strips 16 and 24, while leaving the indium tin oxide behind to define the electrode strips. However, after removal of the chromium/gold, indium tin oxide remains between electrode strips 16 and 24, and between the conductors driving the electrode strips 16 and the conductors that will drive the active electrodes. The ITO is then removed to define the electrode strips and the conductors. This leaves behind, deposited on the silicon frit, active electrode strips 16 and 24, made of ITO, and conductors 26, 28, 30, 32, 36 and 40, made of ITO and chromium/gold.

As an alternative, in the case of relatively large displays, where the conductivity of indium tin oxide may not be sufficient, it may be beneficial to also leave behind thin strips 27 of chromium/gold running along an edge of each fixed electrode strip 16, as illustrated in the phantom lines in FIG. 2. In the case of even larger displays, a second set of thin strips 29 of chromium/gold may also be left behind along the opposite edge of electrode strips 16. Strips 27 and 29, because of their high conductivity will improve addressing in large displays where extended lengths of indium tin oxide may not have sufficient conductivity to provide the necessary drive voltage.

The next step in the process is the lamination of a polypropylene film to serve as a dielectric layer 50. Lamination is performed (after preheating as detailed below) in a conventional laminator such as that sold by Ledco of Rochester N.Y. under catalog number HD 25. Lamination is performed by first backing up the pane of glass with an aluminum plate which is ⅛ inch thick. The aluminum plate is simply put against the back of the pane of glass without adhesive prior to feeding the aluminum plate and the pane of glass into the laminator. The sheet of aluminum bears against the side of the pane of glass which is not covered with the ITO/Cr/Au pattern illustrated in FIG. 1. The purpose of the sheet of aluminum is to give rigidity and strength to the sheet of glass bearing the pattern of FIG. 1, thus reducing the likelihood that the glass will crack when it is fed through the laminator, and to hold heat during the lamination process. Thus, aluminum is selected as the material to back up the pane of glass, because of its strength and its good heat conductivity.

Figure 18:
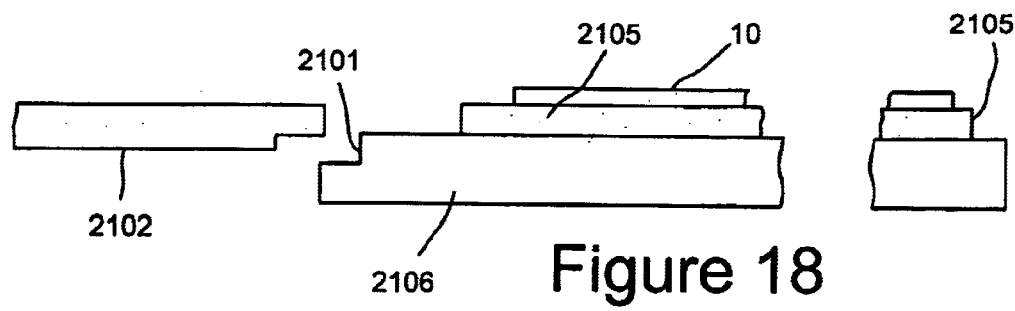
FIG. 18 illustrates the lamination step in accordance with the method of the present invention.

Lamination of a dielectric layer over the ITO/Cr/Au pattern is achieved using a combination of heat and pressure. Accordingly, the sheet of glass with the pattern illustrated in FIG. 1 etched into it and with a transparent active area comprising electrode strips 16 along with the aluminum backing plate is preheated in an oven preheated to 275 degrees Fahrenheit for 20 minutes. Preheating is done over a hot plate 2106, as shown in phantom lines in FIG. 18.

When it is desired to perform the lamination of the dielectric made of polypropylene film to the sheet of glass 10, polypropylene film is loaded into the laminator. The laminator heater is brought to its operating temperature of 150 degrees Fahrenheit. The aluminum plate and the sheet of glass, preheated by having resided in the oven at 275 degrees Fahrenheit for 20 minutes, are then pushed into the laminator. This may be facilitated by providing the edge of the aluminum plate 2100 with ledge 2101 for receiving pusher 2102, which performs the function of preventing contact between the fingers of the laminator operator and the hot sheet of glass which forms substrate 10, as illustrated diagramatically in FIG. 18. Using the pusher 2102, the sheet of glass 10 and the aluminum plate 2105 are pushed into the laminator. The front edge 2105a is pointed to improve lamination.

The polypropylene film which is laminated over the entire surface of glass substrate 10, including the transparent area, of electrode strips 16, has a thickness of eight microns. Moreover, because of the size of the polypropylene film used, substantial amounts of film extend beyond the edges of glass substrate 10.

The use of polypropylene film which has had one of its planar surfaces ionized to receive a metal layer is particularly preferred to achieve good adhesion between the polypropylene and the glass plate substrate 10. In particular, adhesion can be promoted by placing the ionized surface of the polypropylene film against the top surface of substrate 10 (which top surface bears the ITO/Cr/Au pattern illustrated in FIG. 1. Such polypropylene film with an ionized surface is commonly available on the market, as this is the form in which polypropylene film which is to be covered with a layer of metallization is sold. In particular, in connection with the use (outside the context of the present invention) to which such film is usually put, it is contemplated that the film, with the ionized surface, will receive a metal layer, such as aluminum, or the like on the ionized surface of the film.

After the sheet glass substrate 10 leaves the laminator, a sharp knife edge such as a razor is used to cut the polypropylene film so that it only covers the transparent active area of the substrate. In doing such cutting, enough pressure is applied to the razor to ensure that the razor cuts all the way through the polypropylene film. The indium tin oxide coating on glass substrate 10 is relatively tough and thus is not damaged by the razor. Once the cut has been made to all four sides of the active area, the perimeter portion of the polypropylene film, surrounding the active area of the display, applied by the laminator may be removed by peeling it away by hand. This leaves behind on the glass plate a relatively small sheet of polypropylene approximately 35 cm (about 14 inches) by about 26.5 cm (about 10.5 inches) and overlying the active area of the display.

Figure 19:
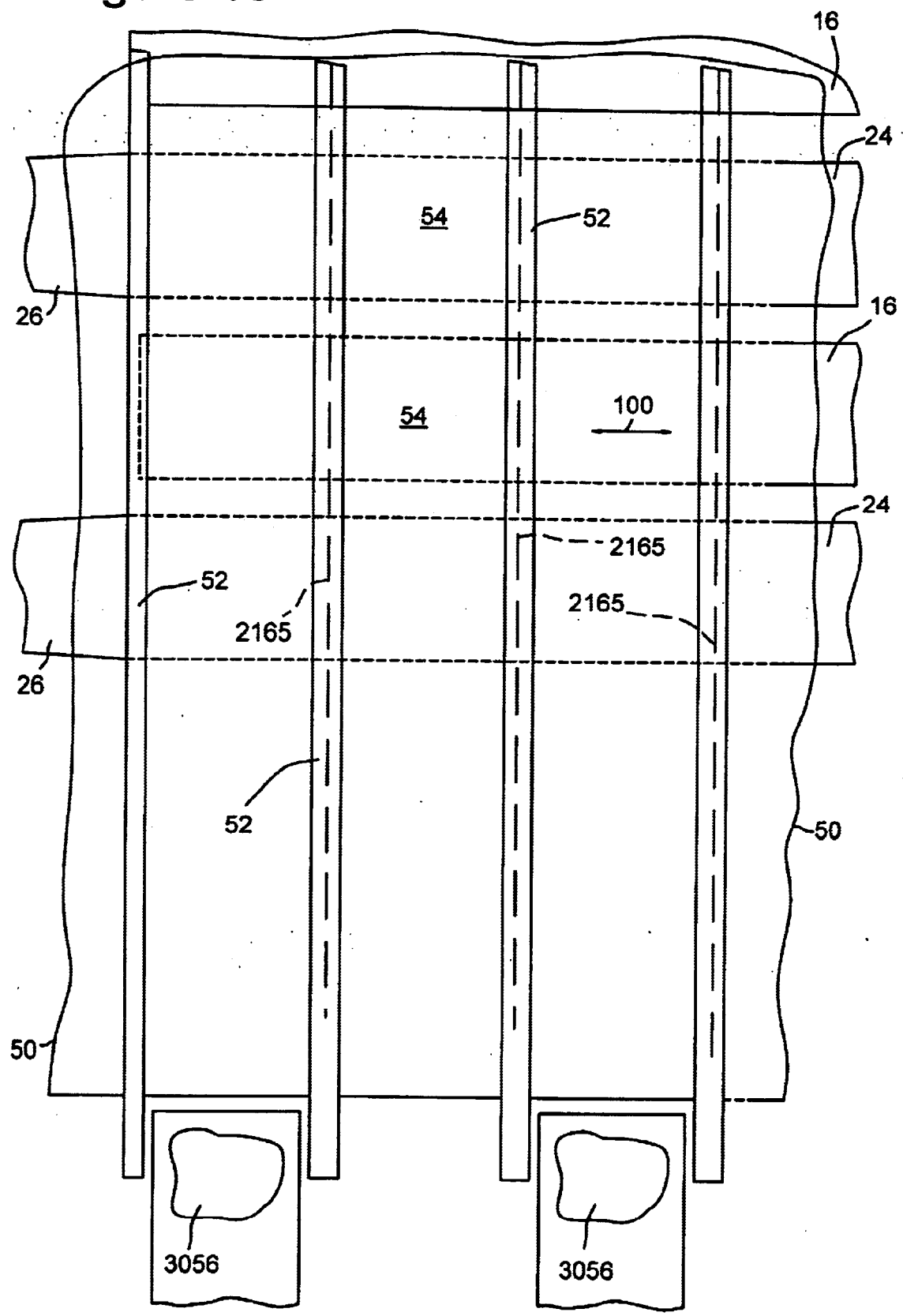
FIG. 19 illustrates an alternative structure and method in accordance with the invention.

After the perimeter of the polypropylene sheet has been removed, leaving behind the patch of film over the active area of the display, an insulative adhesive material is applied in the form of a plurality of strips 3052, as illustrated in FIG. 19. In addition, a rectangular band 3053 of the same adhesive is applied around the active area, as illustrated in FIG. 19. Strips 3052 should have a width of five mils or less, but widths on the order of seven to eight mils may be acceptable, as involving a minimal compromise of active pixel area.

Scotch brand adhesive catalog number 4693 made by 3M is reformulated to form adhesive strips 3052 and rectangular band 3053. Reformulation is achieved by allowing all the solvent in the commercially available form of Scotch 4693 to evaporate. The material which remains is then mixed with a solvent sold by Creative Materials under its catalog number 113-12. The addition of this solvent is carried on until the resulting material has the viscosity of the thickest honeys. The precise ideal viscosity varies from time to time, apparently due to numerous environmental factors as well as the degree to which the silk screen used to apply the adhesive has absorbed solvent. In practice, best results are achieved by experimenting with the viscosity of the adhesive during the time of application to see what works best, noting, however, that before the quality of the silkscreening of the adhesive lines can be assessed, it is usually necessary to make two or three silkscreen prints until the process has stabilized.

Such silkscreen printing of the strips 3052 and rectangular band 3053 may be carried out with a commercially available silkscreen printer such as that made by Systematic Automation of Bloomfield, Conn. and sold by that company under catalog number 810-20. The adhesive is applied using a silicone doctor blade. After application through the vehicle of silkscreen printing, strips 3052 and rectangular band 3053 are allowed to cure overnight. After curing, strips 3052 and band 3053 are not tacky.

The next step is the application of patches of conductive adhesive 3056 as illustrated in FIG. 20. In accordance with the preferred embodiment, an adhesive sold under catalog number EXP 732901 by Ercon of Wareham, Mass. is used to form conductive adhesive patches 3056. Patches 3056 were applied, one patch at a time, as illustrated in FIG. 20. After application the patches are allowed to cure, which usually takes about one to two hours. After curing patches, 3056 are not tacky.

Figure 21:
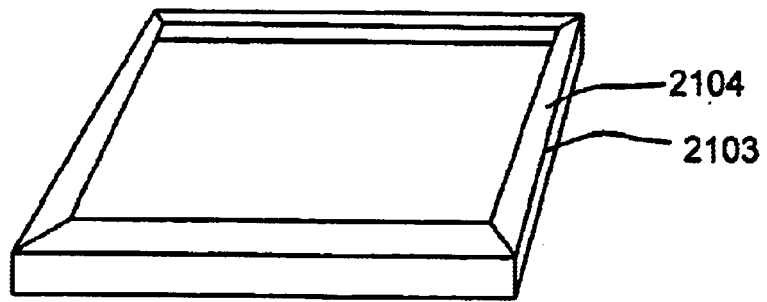
FIG. 21 illustrates a frame for practicing the inventive method.

After strips 3052, rectangular band 3053 and patches 3056 have cured, glass plate substrate 10 is ready to receive metallized plastic sheet 58. This is done by taking an aluminum frame 2103, as illustrated in FIG. 21, and covering its top surface with double stick Post It brand tape 2104, which allows easy adhesion to and removal of adhered objects from the top surface of the frame.

Polyethylene naphthalate, commonly known as PEN, metallized with a layer of aluminum having a thickness on the order of one or two microns, is then used to form the active electrodes. This is done by mounting the polyethylene naphthalate sheet on frame 2103 with the metal layer facing away from tape 2104. Thus, the side of the polyethylene naphthalate sheet 58 without any metal on it is adhered to tape 2104. As alluded to above, when the polyethylene naphthalate sheet 58 is manufactured, it is tentered more strongly in the so-called machine direction, that is the direction in which the material came out of the machine which manufactured the polyethylene naphthalate sheet 58. This direction is indicated by arrows 100 in FIG. 19.

It is important that when the polyethylene naphthalate sheet 58 is adhered to glass plate substrate 10 (over strips 3052, rectangular band 3053 and patches 3056, and the laminated polypropylene film patch over the active area of the display), that polyethylene naphthalate sheet 58 be oriented with its direction of tentering oriented in the directions indicated by arrows 100. This ensures that subsequent heating will result in the formation of a coiled active electrode. Such heating tends to tighten molecular chains pulled out during the tentering process, thus reducing their length to be shorter than the overlying portions of metallization. This results in the desired coiling of the active electrode after it has cooled.

After the polyethylene naphthalate sheet 58 has been mounted on frame 2103 and secured thereon by double stick tape 2104, frame 2103 with sheet 58 secured to frame 2103 is annealed by being placed in an oven at 205 degrees Fahrenheit for 1 hour. At the same time, glass plate substrate 10 is also put in frame 2103 with sheet 58 secured to it, and the glass plate substrate 10 is also heated. Both the glass plate substrate 10 and frame 2103 with sheet 58 secured to it are then removed from the oven. The metal layer on sheet 58 is then placed against glass plate substrate 10, and a roller is used to adhere sheet 58 to the top of glass plate substrate 10. Adhesion is achieved because the heating of the glass plate substrate 10 has resulted in heating strips 3052, rectangular band 3053 and patches 3056, causing them to be tacky.

The resulting adhered assembly is then allowed to cool to room temperature, usually about 80 degrees Fahrenheit. This is done with the polyethylene naphthalate sheet 58 still secured to frame 2103 by double stick tape 2104. Excess polyethylene naphthalate sheet material, that is the material outside of rectangular band 3053, is trimmed away after cooling.

After trimming has been performed, a laser is then used to burn away strips 2165, which have a width in the range of 0.2 to 0.5 mils. Strips 2165 are shown in shaded lines in FIG. 20, to form an electrically isolated line of material which will be used to fabricate active electrodes. The active electrodes are formed by using a laser to burn away the material indicated by lines 2197 in FIG. 20. The active electrodes 2168 curl into coils as indicated in phantom lines in FIG. 20.

The tendency of the annealed polyethylene naphthalate sheet to curl in the machine direction makes it advantageous to make cuts 2197 before cuts 2197b. The resulting pixels are spaced apart 22 mils, center to center, in the horizontal and vertical directions.

Although the above process steps are carried on in a cleanroom, washing the finished display may be advantageous. This may be done by simply putting the finished display in a tray of deionized water and agitating the tray.

When the finished display is first put in the water, capillary forces cause all the active electrodes to flatten out. The washed display is then removed from the tray and allowed to dry.

In accordance with the preferred embodiment of the invention described in connection with a standard VGA display, the orientation of the active electrodes illustrated in FIG. 20 is a particular value, insofar as the far end 2109 of each active electrode is substantially isolated from wrinkling or other undesirable influences associated with the glue which holds down the active electrode sheet layer.

Figure 22:
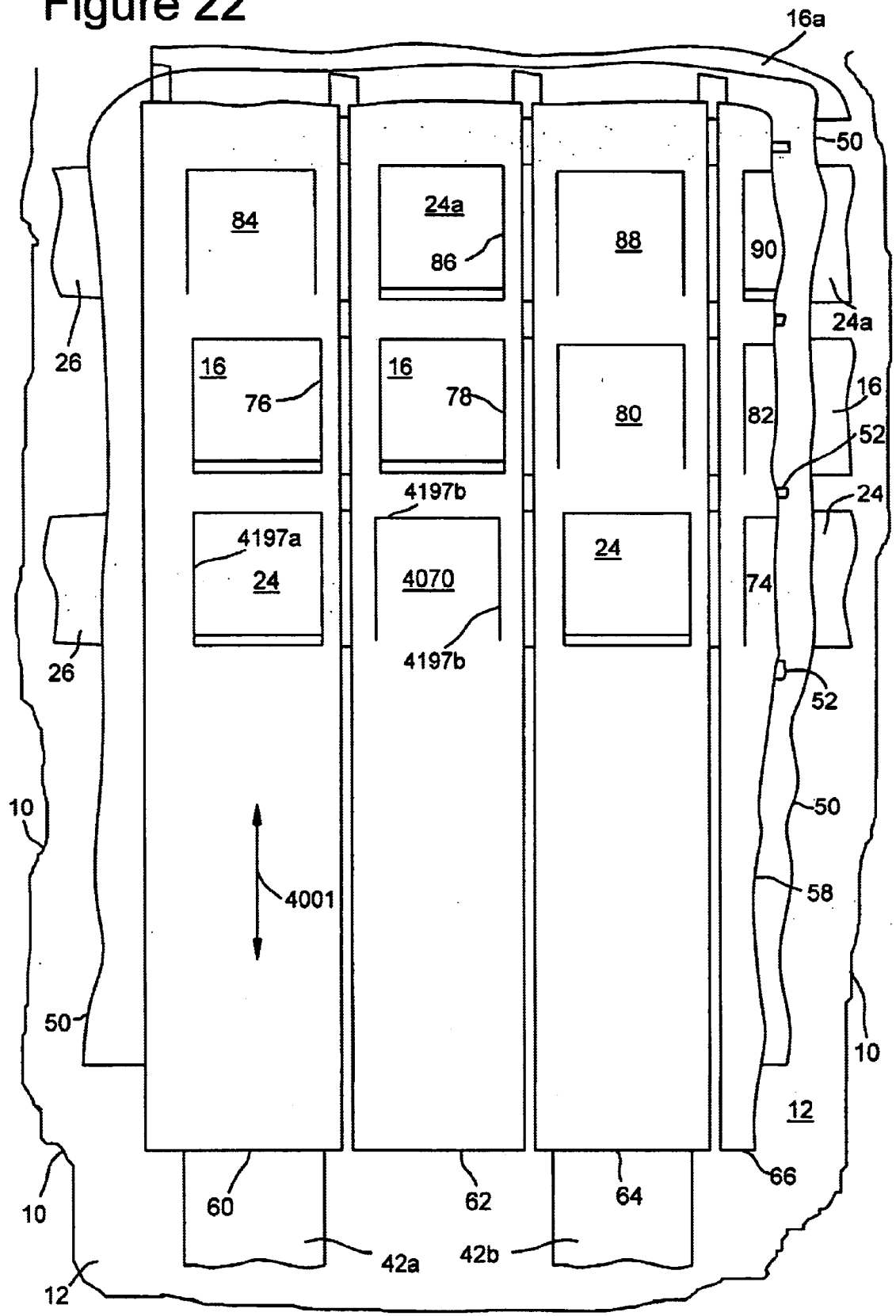
FIG. 22 illustrates yet another alternative structure for the inventive system.

On the other hand, in certain circumstances (such as mass production of the subject inventive display with the machine direction of automated assembly aligned with the machine direction for the film), it may be of value to lay the film down with the machine direction of the film oriented in the direction of arrows 4001 as illustrated in FIG. 22. In this circumstance, active electrodes would be cut as illustrated by, for example, active electrode 4070. Similarly, cuts 4197a should be made before cuts 4197b, on account of the orientation of the curl that forms when the annealed film is cut.

While an illustrative embodiment of the invention has been described above, it is, of course, understood that various modifications will be apparent to those of ordinary skill in the art. Such modifications are within the spirit and scope of the invention, which is limited and defined only by the appended claims.

What is claimed is:

1. A method of manufacturing a light modulating capacitor display by successive operations on an assembly, comprising:
   (a) forming a layer of a conductive material on a substrate in a pattern, said pattern forming a plurality of fixed electrodes, said pattern forming electrical conductors for driving said fixed electrodes and said pattern forming electrical conductors for driving shutter electrodes;
   (b) laying down a layer of insulative material over portions of said pattern forming said plurality of fixed electrodes;
   (c) laying down a shutter electrode forming layer and attaching the same to said assembly, said shutter electrode forming layer having a conductive side and a nonconductive side, said conductive side being placed in facing, contacting relationship to said layer of insulative material and said pattern of conductive material;
   (d) removing conductive material from said shutter electrode forming layer to form groups of shutter electrodes; and
   (e) cutting a plurality of shutters from said shutter electrode forming layer.

2. A method as in claim 1, wherein said portion of said pattern forming a plurality of fixed electrodes comprises a plurality of strips extending in a first direction, and said portion of said shutter electrode forming layer pattern forming a plurality of lines of shutter electrodes, said shutter electrodes in each line being connected to other shutter electrodes in their respective lines, said lines extending in a second direction, said second direction being oriented to cross said first direction.

3. A method as in claim 2, wherein said first direction is substantially orthogonal to said second direction.

4. A method as in claim 1, wherein said forming of said layer of said conductive material on said substrate in said pattern is performed by starting with a substrate coated with a layer of transparent conductive material and removing portions of said coating of conductive material.

5. A method as in claim 4, wherein said conductive material is left behind over, said pattern forming electrical conductors for driving said fixed electrodes and said pattern forming electrical conductors for driving shutter electrodes, and over a conductor portion of said plurality of fixed electrodes, said conductor portion running substantially the length of said pattern portion forming said plurality of fixed electrodes.

6. A method as in claim 5, wherein said conductive material is indium tin oxide.

7. A method as in claim 6, wherein said forming of said layer of said conductive material further comprises the step of depositing a metal layer on said substrate.

8. A method as in claim 7, wherein said removing of portions of said coating of conductive material comprises:
   (i) forming the pattern by removing said metal layer and said transparent conductive layer to define a plurality of fixed electrodes, said pattern forming electrical conductors for driving said fixed electrodes and said pattern forming electrical conductors for driving shutter electrodes; and
   (ii) forming a transparent pattern portion by removing said metal layer while leaving behind said transparent conductive layer to define a plurality of fixed electrodes.

9. A method as in claim 8, wherein said laying down of said layer of insulative material comprises:
   (i) laying down said insulative material with a size larger than said layer;
   (ii) cutting said insulative material to define an area overlying said fixed electrodes; and
   (iii) removing excess insulative material to leave behind said layer.

10. A method as in claim 1, wherein said forming of said layer of said conductive material further comprises the step of depositing a metal layer on said substrate.

11. A method as in claim 10, wherein said removing of portions of said coating of conductive material comprises:
   (i) forming the pattern by removing said metal layer and said transparent conductive layer to define a plurality of fixed electrodes, said pattern forming electrical conductors for driving said fixed electrodes and said pattern forming electrical conductors for driving shutter electrodes; and
   (ii) forming a transparent pattern portion by removing said metal layer while leaving behind said transparent conductive layer to define a plurality of fixed electrodes.

12. A method as in claim 1, wherein said laying down of said layer of insulative material comprises:
   (i) laying down said insulative material with a size larger than said layer;
   (ii) cutting said insulative material to define an area overlying said fixed electrodes; and
   (iii) removing excess insulative material to leave behind said layer.

13. A method as in claim 1, wherein said portion of said pattern defining a plurality of fixed electrodes comprises a number of substantially parallel strips.

14. A method as in claim 1, wherein said electrode forming layer is a resinous material tentered in a machine direction, said cutting of said plurality of shutters from said shutter electrode forming layer is performed with cuts in a first cutting direction and a second cutting direction, said first cutting direction being different from said second cutting direction, said cuts in said first direction being performed first, and said first direction being substantially parallel to the machine direction associated with said electrode forming layer.

15. A method as in claim 1, wherein said insulative material is bonded to said substrate using a combination of heat and pressure.

16. A method as in claim 15, wherein said insulative material has a side which has been ionized, and said ionized side is positioned against said pattern prior to the application of heat and pressure to said insulative material to laminate said insulative material to said pattern.

17. A method as in claim 16, wherein said substrate is back with a strong heat conducting plate prior to feeding of said substrate with said plate into a laminator applying said heat and said pressure in order to adhere said insulative material to said substrate.

18. A method as in claim 1, further comprising the step of applying a conductive adhesive to said portion of said pattern forming electrical conductors for driving shutter electrodes, after said portion of said pattern forming political conductors for driving shutter electrodes has been fabricated but before said insulative material has been laid down on said substrate.

19. A method as in claim 1, wherein said insulative material is adhered to said substrate by an electrically insulative adhesive.

* * * * *